(12) United States Patent
Taghivand et al.

(10) Patent No.: US 9,991,751 B2
(45) Date of Patent: Jun. 5, 2018

(54) SHORT RANGE WIRELESS COMMUNICATION

(71) Applicant: The Board of Trustees of the Leland Stanford Junior University, Stanford, CA (US)

(72) Inventors: Mazhareddin Taghivand, Campbell, CA (US); Yashar Rajavi, Palo Alto, CA (US); Kamal Aggarwal, San Jose, CA (US); Ada Shuk Yan Poon, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days. days.

(21) Appl. No.: 15/309,934

(22) PCT Filed: May 8, 2015

(86) PCT No.: PCT/US2015/029930
§ 371 (c)(1),
(2) Date: Nov. 9, 2016

(87) PCT Pub. No.: WO2015/172049
PCT Pub. Date: Nov. 12, 2015

(65) Prior Publication Data
US 2017/0237469 A1   Aug. 17, 2017

Related U.S. Application Data

(60) Provisional application No. 61/991,245, filed on May 9, 2014.

(51) Int. Cl.
*H04B 5/00* (2006.01)
*H02J 50/12* (2016.01)
(Continued)

(52) U.S. Cl.
CPC .............. *H02J 50/12* (2016.02); *H02J 7/025* (2013.01); *H02J 50/20* (2016.02); *H02J 50/70* (2016.02);
(Continued)

(58) Field of Classification Search
CPC .... G06K 19/0723; H02J 50/025; H02J 50/12; H02J 50/20; H02J 50/80; H04L 25/4902; H04L 24/04
(Continued)

(56) References Cited

U.S. PATENT DOCUMENTS 5,099,225 A   3/1992   Narlow et al.
7,343,136 B2   3/2008   Liu et al.
(Continued)

FOREIGN PATENT DOCUMENTS

WO   WO2014071079   5/2014

OTHER PUBLICATIONS

International Search Report and Written Opinion of PCT patent application No. PCT/US2015/29930 dated Oct. 1, 2015.
(Continued)

*Primary Examiner* — Lee Nguyen
(74) *Attorney, Agent, or Firm* — Crawford Maunu PLLC

(57) ABSTRACT

An apparatus can have a power supply circuit configured to receive, from an antenna, a first signal at a frequency exceeding a GHz, and including a rectifier circuit that is impedance matched to the antenna at the first frequency and that is configured to generate a supply voltage by rectifying the first signal at the first frequency. A signal generation circuit can be configured to use the supply voltage to generate a second signal at as higher frequency and to operate in two different power modes in response to a data signal. A transmitter circuit can be configured to use the supply voltage to create pulse at the higher frequency of the
(Continued)

signal and in response to the data signal, and that includes an amplifier circuit configured to receive the data signal and provide an amplification of the data signal to the antenna.

21 Claims, 25 Drawing Sheets

(51) Int. Cl.
    *H02J 7/02*    (2016.01)
    *H02J 50/70*   (2016.01)
    *H02J 50/20*   (2016.01)
    *H04B 5/02*    (2006.01)
    *H04B 7/00*    (2006.01)
    *H04L 25/49*   (2006.01)
    *H04L 27/04*   (2006.01)

(52) U.S. Cl.
    CPC ......... *H04B 5/0031* (2013.01); *H04B 5/0037* (2013.01); *H04B 5/02* (2013.01); *H04L 25/4902* (2013.01); *H04L 27/04* (2013.01)

(58) Field of Classification Search
    USPC ...................................................... 455/41.1
    See application file for complete search history.

(56) References Cited

U.S. PATENT DOCUMENTS

| | | |
|---|---|---|
| 7,603,894 B2 | 10/2009 | Breed |
| 7,693,626 B2 | 4/2010 | Breed et al. |
| 7,889,096 B2 | 2/2011 | Breed |
| 8,081,039 B1 | 12/2011 | Venca et al. |
| 8,169,311 B1 | 5/2012 | Breed |
| 2007/0249294 A1 | 11/2007 | Wu et al. |
| 2010/0066589 A1 | 3/2010 | Sai et al. |
| 2011/0285606 A1 | 11/2011 | De Graauw et al. |
| 2012/0032876 A1 | 2/2012 | Tabe |
| 2012/0176237 A1 | 7/2012 | Tabe |
| 2012/0296974 A1 | 11/2012 | Tabe |
| 2013/0157729 A1 | 6/2013 | Tabe |
| 2013/0215979 A1 | 8/2013 | Yakovlev et al. |
| 2014/0059443 A1 | 2/2014 | Tabe |
| 2015/0333534 A1* | 11/2015 | Liu ..................... H01L 29/7391 307/104 |

OTHER PUBLICATIONS

M. Boers, et al, "A 16TX/16RX 60GHz 802.11ad Chipset with Single Coaxial Interface and Polarization Diversity," ISSCC, pp. 344-345, Feb. 2014 Abstract only.

T. Mitomo, et al, "A 2Gb/s-Throughput CMOS Transceiver Chipset with In-Package Antenna for 60GHz Short-Range Wireless Communication," ISSCC, pp. 266-268, Feb. 2012.

H. Wang, et al, "A 60-GHz FSK Transceiver with Automatically-Calibrated Demodulator in 90-nm CMOS," VLSI Circuits Symposium, pp. 95-96, Jun. 2010.

L. Kong, et al, "A 50mW-TX 65mW-RX 60GHz 4-Element Phased-Array Transceiver with Integrated Antennas in 65nm CMOS," ISSCC, pp. 234-235, Feb. 2013.

A. Siligaris, "A low power 60-GHz 2.2-Gbps UWB transceiver with integrated antennas for short range communications," RFIC Symposium, pp. 297-300, Jun. 2013.

J. Lee, et al, "A Low-Power Low-Cost Fully-Integrated 60-GHz Transceiver System with OOK Modulation and On-Board Antenna Assembly," JSSCC, vol. 45, No. 2, pp. 264-275, Feb. 2010.

* cited by examiner

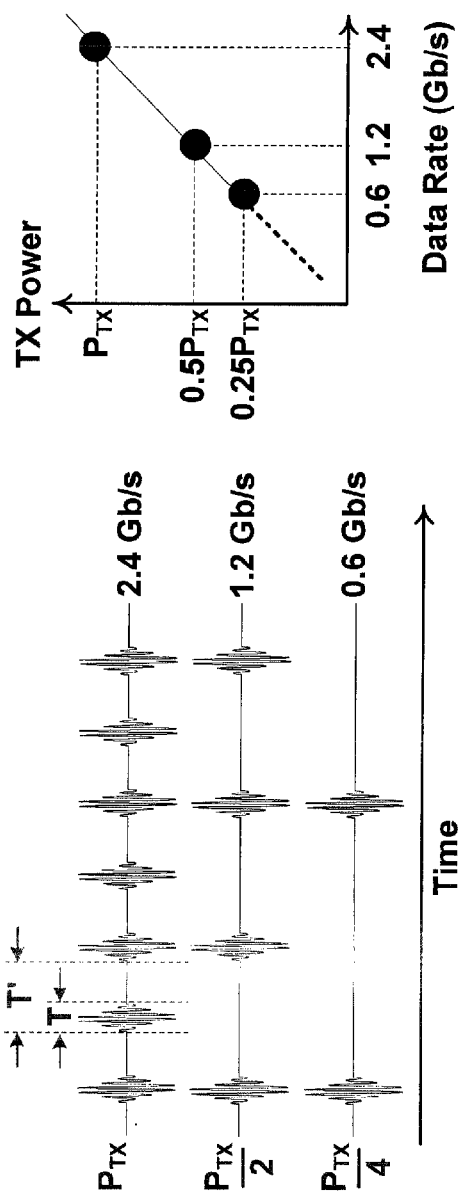
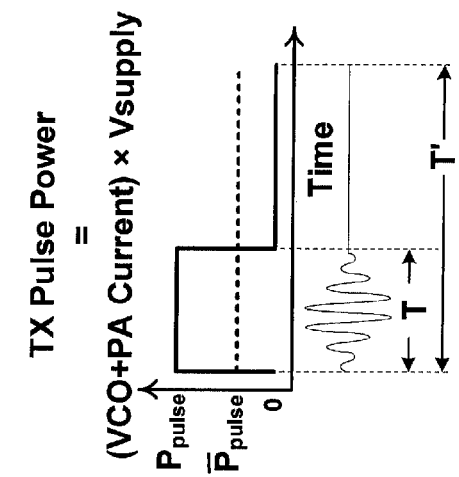
FIG. 3A
FIG. 3B
FIG. 3C

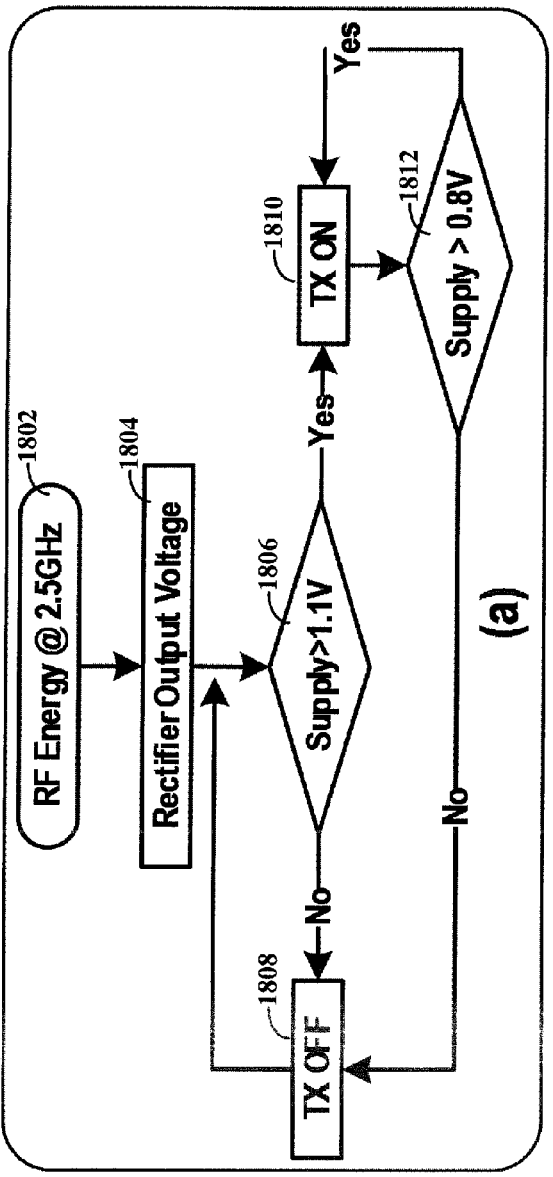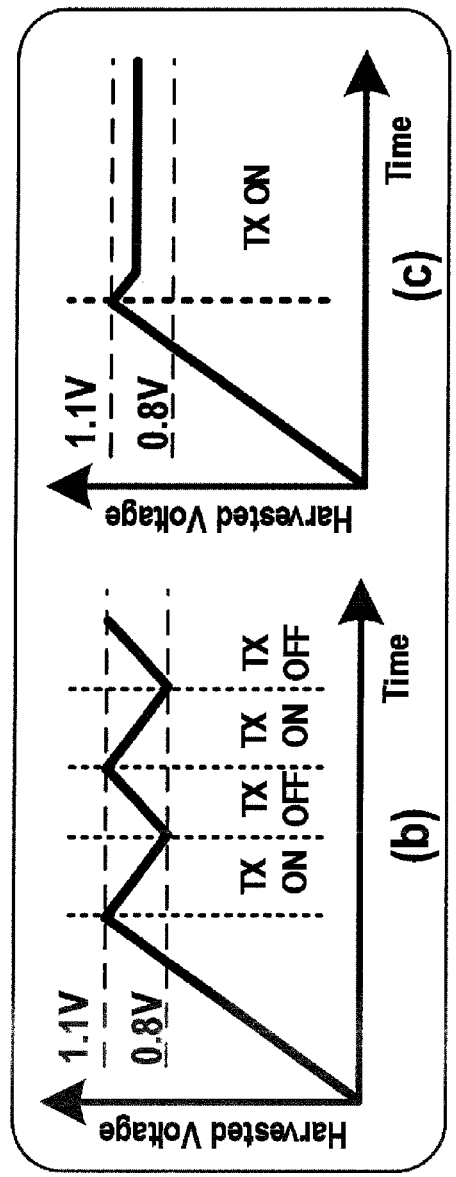
FIG. 18A  FIG. 18B  FIG. 18C

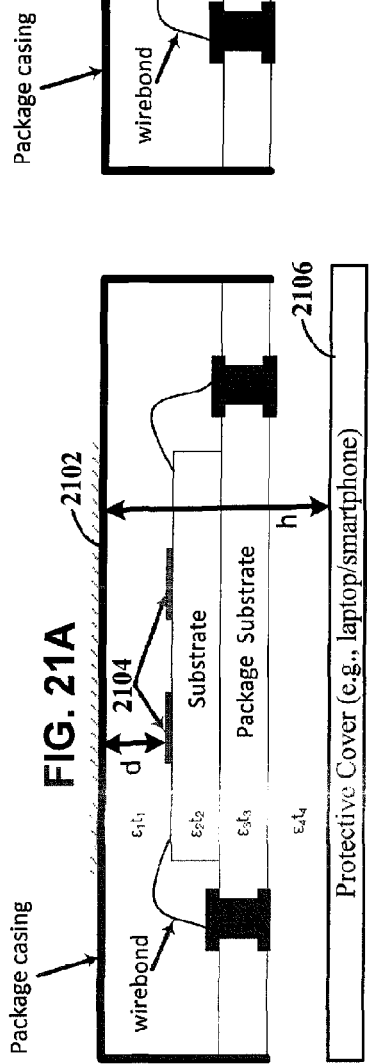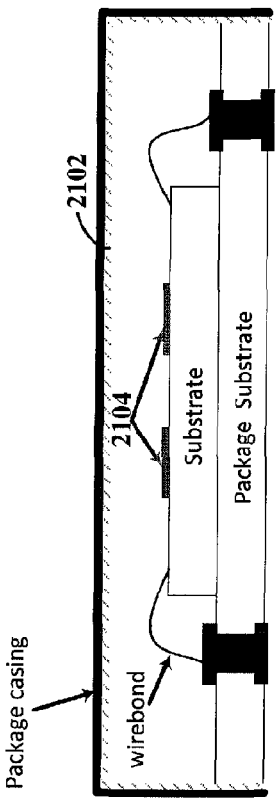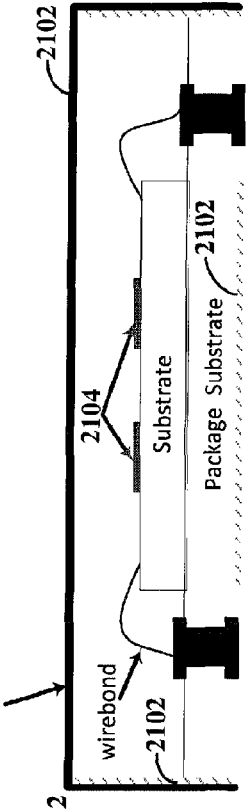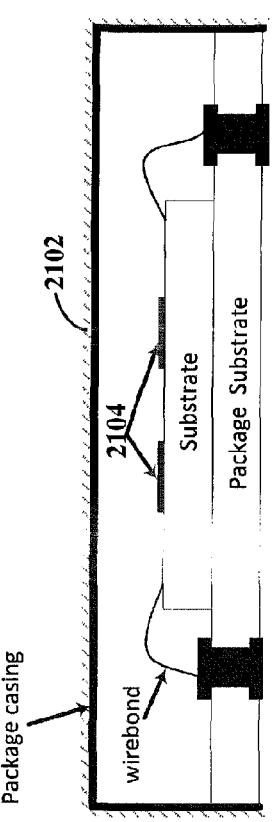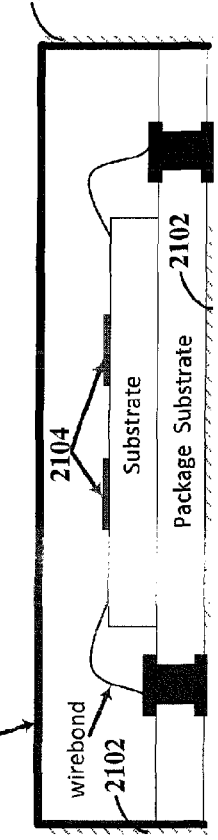
FIG. 21A  FIG. 21B  FIG. 21C  FIG. 21D  FIG. 21E  FIG. 21F

SHORT RANGE WIRELESS COMMUNICATION

FIELD

Aspects of various embodiments are directed to wireless communication solutions and more particular aspects are directed toward wireless communication solutions using power harvested from a wireless transmission.

OVERVIEW

Wireless communication in the millimeter wave band, for example, spectrum in the 57-64 GHz band can provide high-bandwidth communication links. One category of receivers in these bands focuses on providing a reliable wireless link at long range (>1 m) and maximizes data rate via enhancing the spectral efficiency at the expense of high power consumption and costly antenna-chip packaging technology. Examples are wireless docking and wireless HD. The long range requirement often uses high gain off-chip antennas in two-dimensional arrays for beam-forming. In order to achieve high spectral efficiency, more symbols can be packed into a limited band-width (BW), hence the system may use more complex modulations such as 16 quadrature amplitude modulation (QAM) and 64 QAM. These modulation schemes in turn increase the system linearity and noise requirements. The design of linear radio frequency (RF) front-ends, low noise RF and base-band (BB) blocks, and low phase noise local oscillator (LO) further increases the power consumption and complexity of these radios. Since beam-forming is an integral part of this category of transceivers, additional challenges arise in the implementation of phase shifters in either RF, LO, BB, or any other combination. These complexities increase the cost, size, and power consumption of a product, hence limiting the use of 60 GHz radios in mass markets.

SUMMARY

Various embodiments are directed toward wireless communications, circuits, and methods. Particular embodiments include circuitry designed to accommodate high frequency communications with power savings and size being taken into account. Embodiments also include specially designed antenna structures.

Embodiments are directed toward an apparatus that has a power supply circuit connected to an antenna and configured to receive, from an antenna, a first signal that alternates between a two signal states according to a first frequency exceeding a GHz, and including a rectifier circuit that is impedance matched to the antenna at the first frequency and that is configured to generate a supply voltage by rectifying the first signal at the first frequency. A signal generation circuit can be configured to use the supply voltage to generate a second signal having a second frequency that is higher than the first frequency and to operate in two different power modes in response to a data signal. A transmitter circuit can be configured to use the supply voltage to create pulse at the second signal and in response to the data signal, and that includes an amplifier circuit configured to receive the data signal and provide an amplification of the data signal to the antenna.

Certain embodiments are directed toward an apparatus that includes an encoding circuit configured to generate a data signal that has pulses occurring according to data and first frequency. An oscillator circuit can be configured to enter, in response to the generated pulses, a first mode in which the oscillator circuit is configured to generate an output signal that oscillates at a second carrier frequency that is higher than the first frequency, and to enter, in response to the pulses, a second mode in which the oscillator circuit is configured to reduce power consumption by disabling the generation of the output signal. A power amplifier circuit can be configured to enter, in response to the pulses, a third mode in which the amplifier circuit is configured to amplify the output signal and provide the output signal, as amplified, to an antenna, and to enter, in response to the pulses, a fourth mode in which the amplifier circuit is configured to reduce power consumption by disabling the amplification of the output signal.

Various embodiments are directed toward a system with a semiconductor chip that includes a semiconductor substrate; a first antenna the semiconductor substrate; a second antenna the semiconductor substrate and located at a distance from the first antenna; a multiple-input multiple-output transceiver circuit configured to use the first and second antenna to transmit data using signals having a wavelength that is more than twice the distance; and a conductive plate that is configured to improve gain of the antennas for the signals of the wavelength.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which:

FIGS. 3A-3C show graphs relating to different transmission and data rates, consistent with embodiments of the present disclosure

FIG. 18A shows the state diagram for supply detection circuit, consistent with embodiments of the present disclosure;

FIG. 18B shows a graph of supply voltage with a hysteresis for the transmitter enable and disable control, consistent with embodiments of the present disclosure;

FIG. 18C shows a graph of supply voltage where there is sufficient harvest voltage available, consistent with embodiments of the present disclosure;

FIGS. 21A-21F depict various on-chip antenna configurations for quad-flat no-leads (QFN) packaging, consistent with embodiments of the present disclosure;

Figure 1:
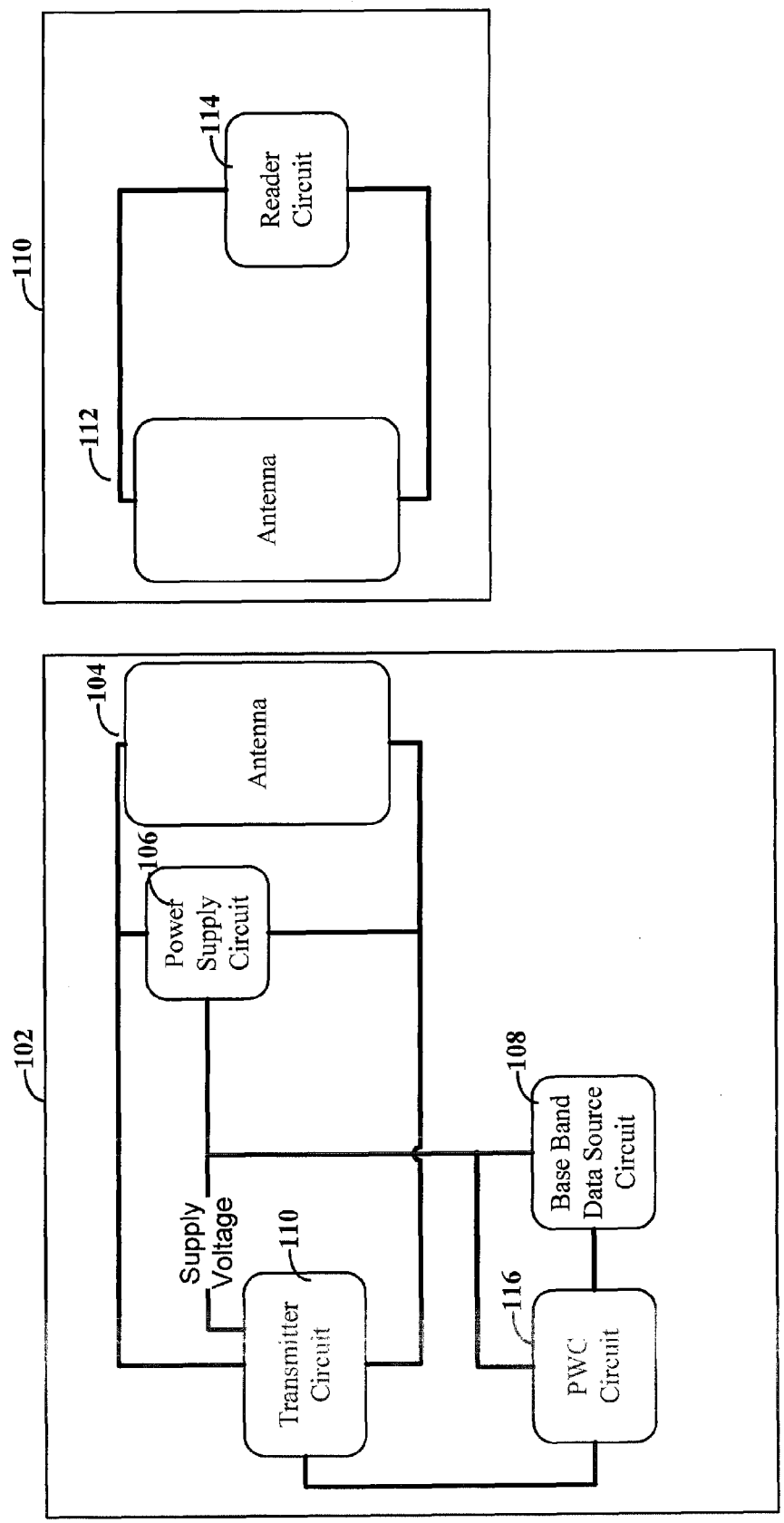
FIG. 1 depicts a block diagram of a system for RF communications, consistent with embodiments of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving radio frequency (RF) communications, and more particular aspects are directed toward transmitter and receiver circuits for RF communications. While not necessarily so limited, various aspects may be appreciated through a discussion of examples using this context.

Embodiments of the present disclosure are directed toward a system that is configured to communicate between a reader device and tag device using a first frequency in the GHz range (e.g., 1 GHz or greater) for powering of the tag and a second frequency for communication from the tag to the reader. For instance, a tag device can include a power supply circuit that is configured to produce a supply voltage from a signal that is receive, from an antenna. This signal oscillates, or alternates between a signal states, according to a first frequency. For instance, the received signal can have a frequency within an unlicensed industrial, scientific and medical (ISM) band, e.g., a band with a center frequency at 2.45 GHz. In some embodiments, the tag device can be configured to communicate with the reader device at another, higher, frequency using the received signal as a basis for the modulation. For instance, a clock generation circuit of the tag device can generate a clock signal that is used in the modulation a signal transmitted back to the reader device (e.g., using OOK). More particularly, a transmitter circuit that is powered by the supply voltage from the power recover circuit can generate the modulated signal for transmission back to the reader device. This second signal can be at a different frequency, such as at a higher ISM band. In a particular example, the second signal can be within an unlicensed band at 57-64 GHz.

According to embodiments, a transceiver circuit can be configured to allow for the use of the same antenna for transmission and receipt. In particular embodiments, the transceiver circuit is further configured to harvest energy from a received signal operating at a first frequency and transmit using a signal operating at a second, higher frequency. For instance, voltage controlled oscillator circuit configured to generate a first signal that oscillates at the higher frequency (e.g., ~60 GHz). An encoding circuit can be configured to selectively provide, in response to a base band (BB) data signal operating at a second frequency (e.g., ~2.5 GHz), the first signal to a first output node and a second output node. This may be consistent with, for example, RZ-OOK modulation. A first set of transistors can facilitate provide isolation for the transmitter from the antenna. For example, a first transistor of the set can having a gate that is connected to a transceiver mode signal and a drain and a source that are connected between a first antenna and the first output node. A second transistor, also of the set, can have a gate that is connected to the transceiver mode signal and source and drain that are connected between a second antenna and a second output node. The transceiver mode signal can indicate whether the transceiver is acting as a transmitter or receiver. An inductor can be connected between the first and second antennas and can include a tap that is connected to ground. A third transistor can be used to provide isolation for the receiver portion of the circuit. For instance, the third transistor can have a gate that is connected to the transceiver mode signal and a drain and a source that are coupled between the first and second antennas. The receiver portion of the circuit can include a low noise amplifier (LNA) circuit that is connected to the drain and source of the third transistor.

Certain embodiments are directed toward a receiver (or reader) device that is configured to provide power saving based upon the status of an RF harvest signal that is provided by the receiver for use by a transmitter (or tag) device. For instance, a transmission circuit can be configured to provide, to an antenna, a first signal for powering of the tag device. The first signal can that alternates between a first signal state and a second signal state according to a first frequency, such as at ~2.5 GHz. The receiver device can also include a control circuit that is configured to generate a control signal by introducing a delay to the first signal. For instance, the delay can be set according to an expected return time of a data carrying signal from the tag. In certain communication schemes, such as variations of OOK, the tag device can be configured to transmit data as a function of the state of the received data carrying signal. Thus, there can be times during which no data will be transmitted and the receiver can be configured to reduce power according. As an example, the receiver device can include a receiver circuit for which a portion of the receiver circuit that is configured to receive a signal that alternates between two signal states according to a second frequency that is higher than the first frequency (e.g., ~60 GHz). The receiver circuit can be configured to operate in a reduced power state when no signal is expected. In particular, the receiver circuit can be configured to operate, in response to the control signal being in the first signal state, in a first mode in which the portion of the receiver circuit is in a reduced power state; and operate, in response to the control signal being in the second signal state, in a second mode in which a the portion of the receiver circuit is in an increased power state.

Embodiments are directed toward a fully integrated 2×2 OOK 60 GHz transceiver with on-chip dipole antennas while using energy harvesting in the transmit mode. Energy can be harvested at 2.45 GHz with an average efficiency of 30%. For a data rate of 2.45 Gb/s, the transceiver provides a bit error rate (BER)<$5 \times 10^{-4}$ with an energy efficiency of 2.6 pJ/bit at a distance of 5 cm. At 10 cm, with a BER<$5 \times 10^{-5}$, the transmit energy efficiency is 4.9 pJ/bit for a data rate of 2.45 Gb/s. The device has a small silicon area of 1.62 mm$^2$, which can be particularly useful as a low cost replacement for NFC-type applications with high data rate and low power requirements. The device can also be useful for proximity fast file transfer and is a serious candidate for dense sensor networks with high data rate requirements. In certain embodiments, the device can also be used in wireless neural data transmission for small beings, and even on human brain where large number of electrodes generate a large aggregate data rate.

Embodiments of the present disclosure are directed toward a category of millimeter-wave radios that can be particularly useful for applications that require high data rate, low power, and short range (<1 m) wireless link. Various embodiments can be configured for use with relatively simple modulation schemes such as quadrature phase shift keying (QPSK) (coherent) and on-off keying (OOK) (non-coherent). When coherent modulations are used, the relative phase alignment between the transmitter and receiver is a consideration for the system. Thus, in order to provide phase alignment, the system may be designed to use of a phase lock loop (PLL) in both the transmitter and receiver. Aspects of the present disclosure are based upon a recognition that, especially for high frequency (e.g., 60 GHz) systems, the PLL and the local oscillator (LO) in-phase (I) and quadrature (Q) generation can consume substantial power. For example, a 4×4 QPSK transceiver with on-chip antennas with high data rate and energy efficiency, might use a transmitter that includes four free running voltage controller oscillators (VCOs) and also assumes that the receiver LO knows the frequency of these VCOs. This architecture plus its assumption can severely complicate demodulation in a practical system.

Various embodiments are directed toward systems that use non-coherent modulation. This allows for the use of a transmitter carrier that is not synchronized with the receiver LO. In particular embodiments, a solution, such as OOK, can be implemented without the LO in either of the receiver or transmitter. Since LO generation can consumes a significant amount of power, the elimination of LOs can significantly reduce the power consumption. One solution might be to use a 1×1 OOK transceiver with on-chip antennas and return-to-zero (RZ) signaling that uses pulse-width control (PWC) circuit to reduce the power consumption.

Embodiments of the present disclosure are directed toward a system that includes low cost and low power fully integrated 2×2 60 GHz transceiver with on-chip antennas and a small silicon area (e.g., 1.62 mm$^2$) that includes energy harvesting circuits suitable for near-range communication. The 2×2 system provides a healthy the link budget and consequently the communication distance is relatively long. The transceiver can be configured to utilizing the large bandwidth available at 60 GHz. For instance, the transceiver can use impulse-radio ultra-wideband with RZ-OOK modulation in conjunction with PWC circuit to control power consumption.

In certain embodiments, the transceiver circuit can include a low-loss transmit-receive switch that is configured to facilitate the sharing of two dipole antennas between the transmitter and receiver, which can be particularly useful for saving silicon area. Embodiments are also directed toward a transceiver circuit that is configured to harvest energy at a first frequency (e.g., at the unlicensed ISM band of 2.45 GHz) while transmitting at another frequency (e.g., 60 GHz). Because of the large separation between the 60 GHz and 2.45 GHz frequencies, a potential high power harvesting signal would not desensitize the 60 GHz receiver. This is because the 60 GHz antenna and the receiver would greatly attenuate an out-of-band jammer such as the one at 2.45 GHz. If the harvest and the radio link frequencies were close to each other extra filtering would have been necessary to eliminate a desensitization scenario. Such extra filtering can add cost and further insertion loss to the system.

Various embodiments are directed toward a system that is designed for use with different applications in consumer electronics and the future internet of things (IoT) depending on the power and data rate requirements. As discussed herein, the data rate for systems according to certain embodiments linearly scales with the transmitter power consumption, hence providing an agile platform to support various applications. For instance, transceivers circuits discussed herein could be used as an alternative to the near field communication (NFC), while enabling substantially higher data rate and energy harvesting capability. Another potential application of embodiments is an enabler of point of sale advertisement. The small size of the transceiver circuits discussed herein can enable applications such as neural data transmission of small beings and insects where wireless communication at longer wavelengths could present a mechanical challenge to the biological experimentation due to the large size of the antenna.

FIG. 1 depicts a block diagram of a system for RF communications, consistent with embodiments of the present disclosure. Consistent with embodiments, a tag (or transmitter) device 102 can be configured to communicate with a reader (or receiver) device 104. For instance, the reader device 110 can include reader circuitry 114 that is configured to generate a first signal that is transmitted using an antenna 112. This signal can then be used by the tag device 102 to power the transmitter circuit 110 and other circuitry, such as base band (BB) data source circuit 108. For instance, power recover circuit 106 can be configured to generate a supply voltage from the received signal. In various embodiments, the power supply circuit 106 can be configured to regulate the voltage level of the supply voltage. In certain embodiments, the regulation can be based upon multiple voltage thresholds that provide hysteresis for the supply voltage. The supply voltage can be used to power the transmitter circuit 110 as well as other circuits, such as base band data source circuit 108.

As discussed herein, the power supply circuit can be tuned to harvest power from a signal at a frequency that is significantly lower than the frequency at which the transmitter circuit 110 communicates back to the reader device 110. This difference in frequencies helps to allow for the use of a first (harvest) signal with a high amount of power while simultaneously transmitting at another, higher frequency. As explained in more detail herein, the transmitter circuit 110 and corresponding receiver circuit in the reader circuit 114 can be configured to be less sensitive to the frequency of the harvest signal due, in part, to the large frequency difference relative to the transmitter-generated signal. For example, the power supply circuit 106 can include a matching circuit that is configured to match the impedance of the antenna at the lower frequency, and thereby exhibit an impedance mismatch for the antenna at the higher frequency.

BB data source circuit 108 can be configured to generate a base band data signal that is used to control the modulation of high frequency signal output from the transmitter circuit 110. For instance, the base band data source circuit 108 could generate a return-to-zero (RZ) OOK data signal. This data signal could then be used to gate an oscillator (e.g., a VCO, digital controller oscillator, or a current controlled oscillator) of the transmitter circuit 110 to produce and IR-UWB (or similar) waveform. For ease of discussion, various embodiments of the present disclosure are discussed relative to a VCO, however, other oscillator circuits are possible. The VCO can be configured to produce a signal having a frequency that is significantly higher than the received harvest signal. For example, the VCO could generate a signal operating around 60 GHz, while the received harvest signal could be operating at around 2.45 GHz.

According to embodiments, the transmitter circuit 110 can be configured to operate in two different modes that relate to power consumption. In the first (enabled) mode, the transmitter can amplify the VCO provided signal for transmission using antenna 104. In a second (disabled) mode, the transmitter can reduce power consumption by not amplifying or providing the VCO provided signal. Moreover, the VCO could be configured to operate in two similar modes, one of which the VCO generates the signal (an enabled mode), and the other of which the VCO is effectively off or disabled (a disabled mode). As discussed in more detail herein, the two modes, for both the transmitter circuit and VCO, can be entered in response to the state of BB signal from the data source circuit 108. For instance, assuming an RZ-OOK modulation, the transmitter circuit and VCO could each enter in the enabled mode when the BB signal is high and the disabled mode when the BB signal is low.

Consistent with some embodiments, a pulse width controller (PWC) circuit 116 can be used such that the transmission power can be varied according to factors such as the data rate and bit error rate. For example, the active pulse width (and duty cycle) can be increased for a higher transmission power and data rate, or it can be decreased for a lower transmission power and data rate. In connection with the enabled/disable modes, the adjustment in pulse width results in a corresponding change in power consumption. In particular embodiments, the adjustment can be made by a processing circuit that generates a power control signal indicating the desired pulse width.

Figure 2:
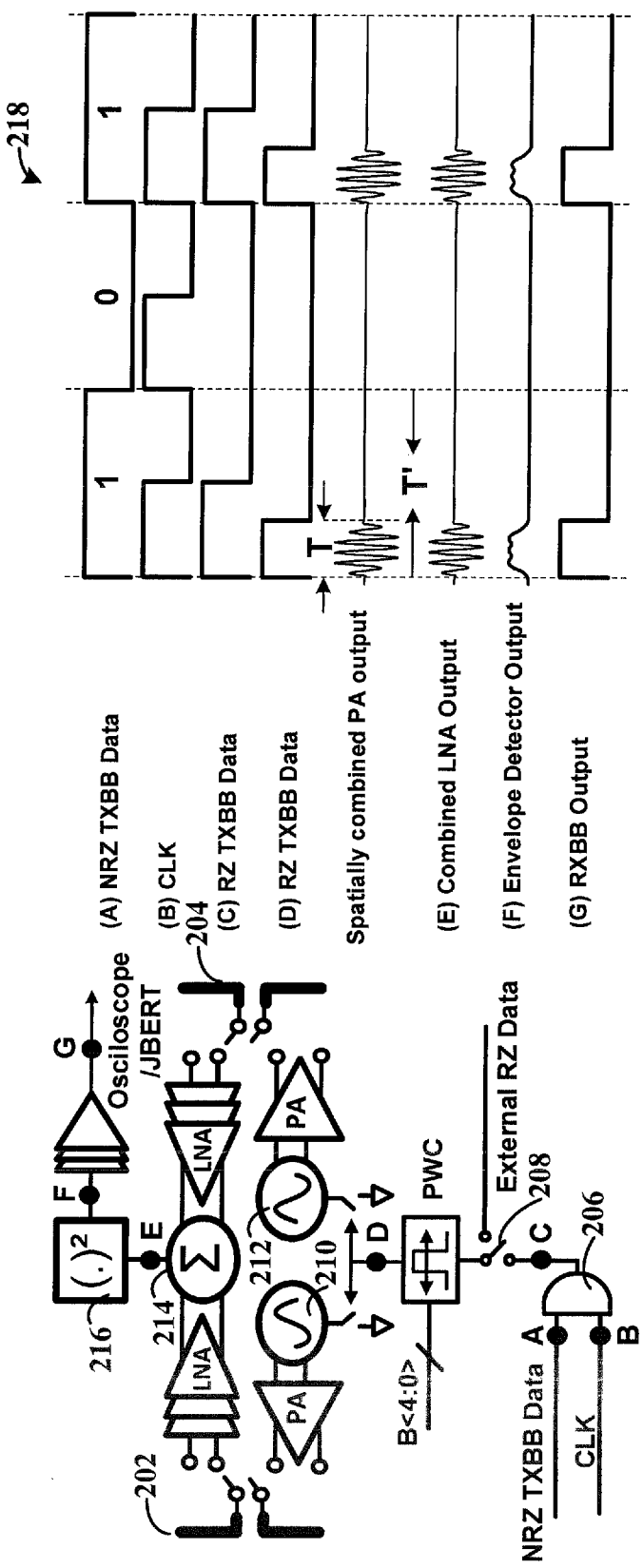
FIG. 2 depicts a transceiver architecture along with the transmit (TX) and receive (RX) timing diagram, consistent with embodiments of the present disclosure.

FIG. 2 depicts a transceiver architecture along with the transmit (TX) and receive (RX) timing diagram, consistent with embodiments of the present disclosure. A transmit-receive switch (TR) enables the two dipole antennas 202, 204 to be shared between the RX and TX modes. In the transmitter, an RZ bit stream is generated from, as an example, a non-return-to-zero (NRZ) baseband signal (NRZ TXBB Data) and a clock signal (CLK) that are fed to an AND gate 206 to produce the RZ TXXBB Data output at C. Alternatively, or in addition, a RZ signal can be directly provided to the transmitter circuit. In some embodiments, a switch 208 can be used to select between an NRZ data source and an RZ data source.

In various embodiments, the RZ signal pulse-width can be programmed according to a desired transmission power. For example, FIG. 2 depicts a 4-bit Pulse Width Controller (PWC) that can be programmed to output pulses with one of 16 different widths. The programming can be accomplished by a processing circuit that determines a desired data rate and/or power consumption and generates a power control signal indicating the corresponding (e.g., 4-bit) setting for the PWC. As a non-limiting example, the PWC can be programmed to generate pulses having a width that can be selected from values of between 200 ps to 500 ps. The signal at the output of the PWC switches on and off two signal generation circuits (e.g., voltage controlled oscillators (VCOs)) 210, 212 and power amplifiers (PAs), simultaneously. When switched on, the VCOs oscillate at the transmission frequency (e.g., 60 GHz), and the PAs transmit power to the two dipole antennas 202, 204 at this frequency.

In the receiver, the voltage outputs of the two LNAs are summed by a summer 214 and fed into an envelope detector 216, shown as point E in FIG. 2. The envelope detector output (point F) feeds the baseband gain stages. The output of the RX baseband is an RZ signal that can drive a load (e.g., of around 50Ω), such as data processing circuits, or an oscilloscope for testing purposes. The baseband comprising of RZ and PWC can be used to enable linear scaling of power with the data rate. For example, with RZ OOK modulation sending a data bit of value "0" consumes no energy as TX is off. A data bit of value "1" is sent by the TX in the form of a short 60 GHz pulse with a duration of T, as shown in graph 218 of FIG. 2. Therefore, for a bit value of "1", the TX consumes power only during the time period of T. By adjusting the PWC pulse size the "on" time, T, during which power is consumed can be adjusted. For example, as the data rate increases (e.g., by increasing the CLK frequency) the pulse size can be increased to accommodate the change.

FIGS. 3A-3C show graphs relating to different transmission and data rates, consistent with embodiments of the present disclosure. As demonstrated in FIGS. 3A-B, the transmit power can be configured to scale linearly with the data rate. This is because as the data rate increases linearly so does the number of active transmission periods T (or "1's"). As shown in FIG. 3A, a transmission rate of 0.6 Gb/s has two active pulses in the depicted time. The transmission rates of 1.2 Gb/s and 2.4 Gb/s have four and eight active pulses, respectively. Thus, assuming the same pulse size, the amount of active transmission time tracks linearly with the data rate, as shown by FIG. 3B.

In addition to the data rate, the transmit power is also a linear function of pulse-width. As shown in FIG. 3C, the transmitter consumes power only during the period T when both the VCO and PA are turned on. The primary source of power consumption is leakage power outside the pulse period, T. The average DC power consumption of a single pulse is:

$$\overline{P}_{pulse} = \frac{T}{T'} P_{pulse} = T \cdot \text{data\_rate} \cdot P_{pulse} \quad (1)$$

Where $P_{pulse}$ is the sum of both the VCO and PA DC power consumptions. Eq. (1) suggests that the average DC transmit power linearly decreases with both the pulse width and the data rate.

The relationship between the received and transmitted signals is given by the Friis transmission equation. For a communication distance of R and a carrier wavelength of $\lambda$, the instantaneous received power $P_r$ and the instantaneous transmitted power $P_t$ are related by:

$$P_r = P_t G_t G_r \left(\frac{\lambda}{4\pi R}\right)^2 \quad (2)$$

where $G_t$ and $G_r$ are the transmit and receive antenna gains, respectively. Consistent with embodiments, the radio can be a multiple-input multiple-output (MIMO) 2×2 system. As explained herein, the gain of the 2-dipole system can be approximated or simulated as 5.2 dB. Because of the reciprocity, the transmit and receive antenna gains can be considered equal, $G_t=G_r=5.2$ dB. As will be discussed herein, during the transmission, each PA can be configured to radiate 3.5 mW, hence $P_t$, the total transmitted power through both PAs, is 7 mW. The smallest instantaneous received signal power (a.k.a receive sensitivity) that results in a desired signal-to-noise ratio, SNR, is given by:

$$P_r = kT \cdot B \cdot F \cdot \text{SNR} \quad (3)$$

where k, T, B, and F are Boltzman constant, temperature in Calvin, bandwidth of the receiver (bandwidth of the transmit pulse should be smaller than or equal to B), and the overall receiver noise factor, respectively. The choice of SNR is dictated by the required bit-error-rate (BER). For a BER<$10^{-5}$, in a non-coherent OOK, the received SNR should be better than 13 dB. From FIG. 3C, this RZ OOK system has a data rate of 1/T'.

Figures 4A, 4B:
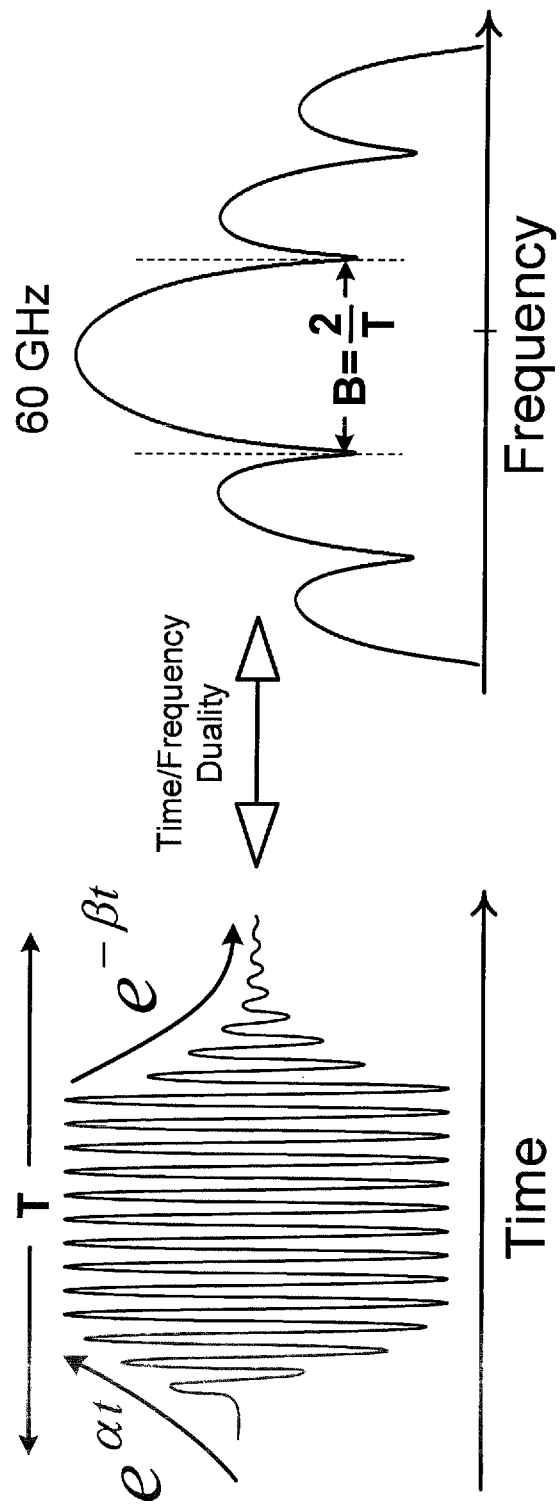
FIGS. 4A and 4B depict a pulse shape and the associate frequency bandwidth, respectively and consistent with embodiments of the present disclosure.

FIGS. 4A and 4B depict a pulse shape and the associate frequency bandwidth, respectively and consistent with embodiments of the present disclosure. As shown in to FIG. 4, the bandwidth of the system is B=2/T. The duality between the time and frequency domain representations of a pulse is illustrated in FIG. 4. In the example implementation discussed above for the PWC adjustability, the bandwidth of the RX is 8 GHz, and the TX bandwidth is programmable through the PWC with the bandwidth up to 10 GHz (corresponding to the narrowest pulse-width of 200 ps). By substituting (3) into (2), the communication distance becomes:

$$R = \sqrt{\frac{P_t \cdot G_t \cdot G_r}{kT \cdot B \cdot F \cdot \text{SNR}}} \left(\frac{\lambda}{4\pi}\right) \quad (4)$$

A link distance of R=10.2 cm is calculated when plugging the following values into (4): $P_t$=7 mW, $G_t$=$G_r$=5.2 dB, k=1.38×$10^{-23}$ J/K, T=300K, B=8 GHz, F=2500 (NF=34 dB), SNR=13 dB, and $\lambda$=5 mm.

The communication distance obtained by (4) does not change with the data rate. This implies that the system can offer a trade-off between the power consumption and the communication range. For applications that allow for a shorter communication range, the TX is can be programmed to switch off one of the PA+VCO elements and transmit through only one PA and associated antenna. This can reduce the total TX power consumption by about a factor of two. In this scenario, the TX will have only one antenna element so the single transmitter antenna gain, $G_t$, will become 2.6 dB as shown in FIG. 14C. The communication distance with $P_t$=3.5 mW, $G_t$=2.6 dB, and keeping all other parameters the same, is about R=5.3 cm. This shows the effectiveness of using two antenna elements in the TX as the link distance was improved by nearly a factor of two relative to a single antenna element. In various embodiments, a higher number of antenna elements in the array can be used to provide a higher beamforming gain. The additional antenna elements, however, can increase the complexity of the system and the amount of silicon area, resulting a higher cost. For low-cost and near range applications, a 2×2 radio can be very effective. Moreover, the communication range can be been longer than indicated above if the receiver NF was better. The measurement results for a 10 cm and a 5 cm communication link is also presented herein. The presented link budget calculations match that of the measurement. The discrepancy in the communication distance could be explained by the simulation inaccuracies in finding the parameters of (4).

Figure 5:
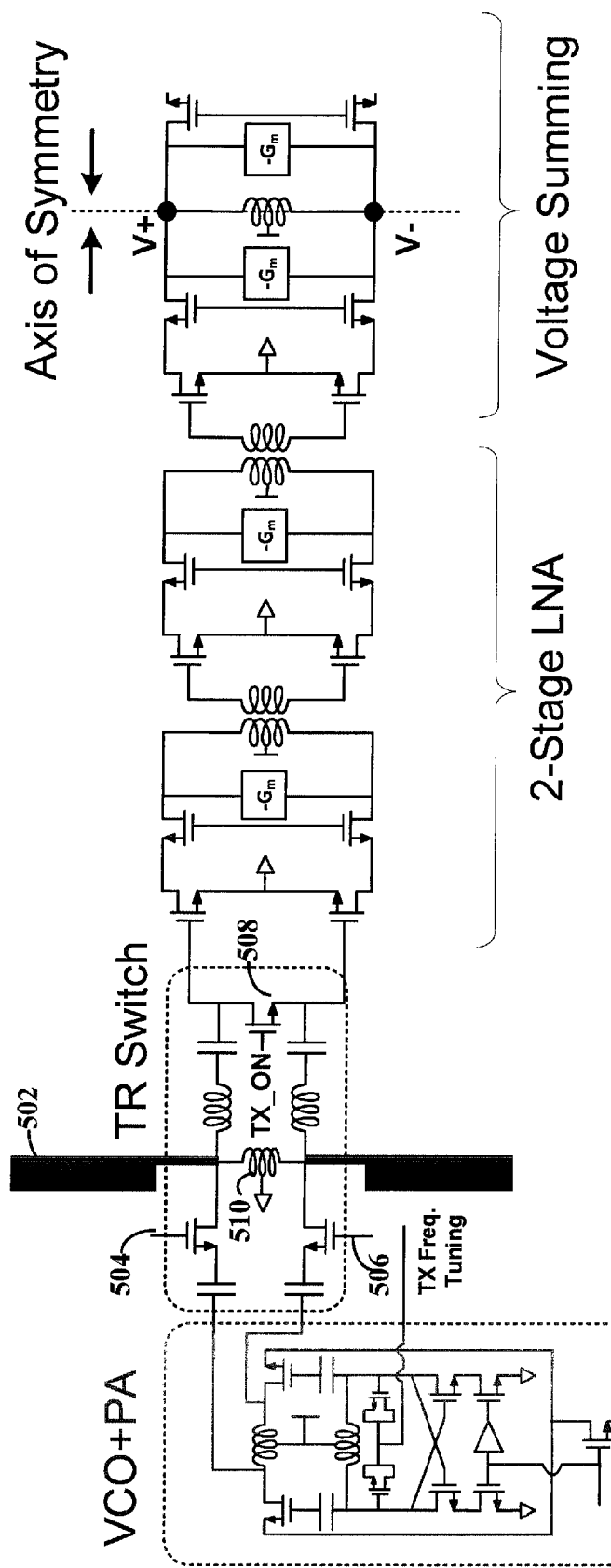
FIG. 5 depicts a transceiver circuit has two separate transmitting elements that are nearly, or fully, symmetric, consistent with embodiments of the present disclosure.

FIG. 5 depicts a transceiver circuit has two separate transmitting elements that are nearly, or fully, symmetric, consistent with embodiments of the present disclosure. As discussed herein, the transceiver circuit of FIG. 5 can be used within a tag device that is configured to communicate with a reader device. FIG. 5 shows half of the symmetric portion, which is duplicated beginning at the location identified as the "Axis of Symmetry." The two symmetrical portions of the transceiver circuit are referred to as different transceiver elements. The duplicated portion is not shown in its entirety for ease of display, but it is understood that the components in the depicted transceiver element are present in a mirrored fashion to produce a 2×2 radio circuit. Each transmit element includes a VCO and a PA. The VCO drives the PA input and the PA drives a differential dipole antenna 502. The TX Freq. Tuning input can be used to control the VCO frequency (e.g., of around 60 GHz).

Consistent with embodiments, the TR switch can include the three transistors 504, 506, and 508 that can be used to control whether the receiver portion (right of the antenna 502) or transmitter portion (left of antenna 502) of the circuit are active. The TR switch, as shown, can also include capacitive coupling to both the transmitter and receiver circuits. Inductor 510 be connected between the differential signal lines and can include a center tap that is connected to a reference voltage, such as to circuit ground.

Figure 6:
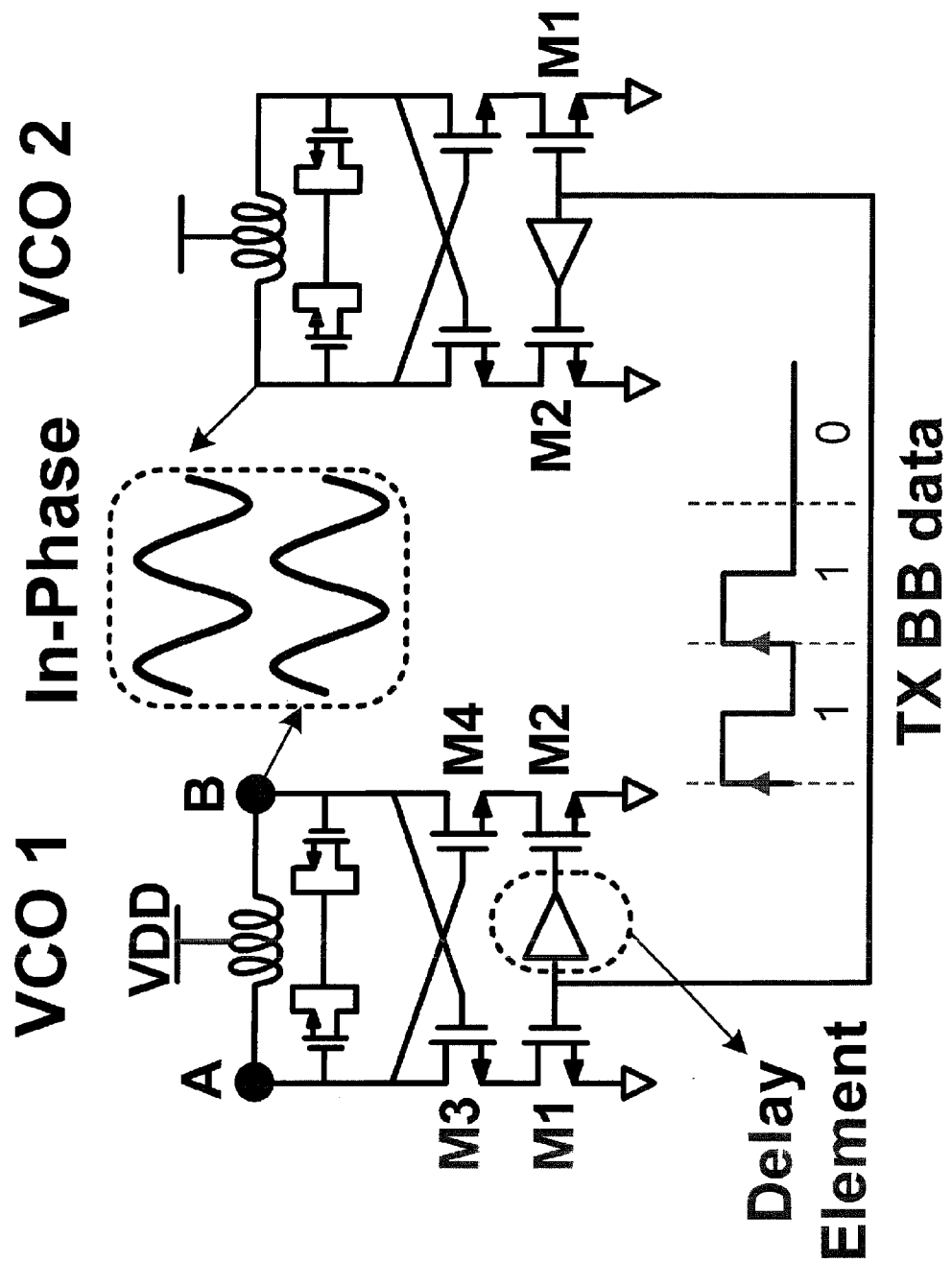
FIG. 6 depicts pair of VCOs and associated timing diagrams, consistent with embodiments of the present disclosure.

FIG. 6 depicts pair of VCOs and associated timing diagrams, consistent with embodiments of the present disclosure. The two VCOs (VCO1 and VCOs) can be part of respective clock generation circuits and are shown as cross-coupled NMOS pairs. Since the phase in OOK carrier/modulation signal does not convey information, the phase noise can be less relevant, or even ignored entirely, for the VCO design. In OOK design, there are two main considerations for the VCO, namely, phase coherency and frequency matching. The phase coherency consideration is that the two VCOs stay in-phase while they are operating. When the VCOs start up from the circuit noise or other small initial perturbations, the two VCO phases would be random and hence not guaranteed to be aligned. Because of this randomness, the electromagnetic waves emanating from the VCOs, after radiating through the antennas by the PAs, could undergo a partial or a complete destructive interference. Consistent with embodiment, the clock generation circuit can be configured to phase align the two VCOs by starting them up with a large voltage initial condition. In certain embodiments, the start-up technique can be modified to make it more suitable for the OOK modulation and to create a larger voltage initial condition across the LC tank of the VCOs. As shown in FIG. 6, at the rising edge of the RZ transmit base-band data, M1 goes into strong triode and pulls the source of M3 to the ground. A sudden rush of current through M3 results in a large voltage perturbation across the VCO LC tank. The same voltage rising edge arrives at the gate of M2 after a time delay, which is provided by the two cascaded inverters. Therefore, M2 turns on and enters into a strong triode. At this point the differential voltage across the VCO LC tank is large, for example, 200 mV. This helps to ensure that both VCOs to start at the same phase and quickly reach a maximum swing.

Figure 7:
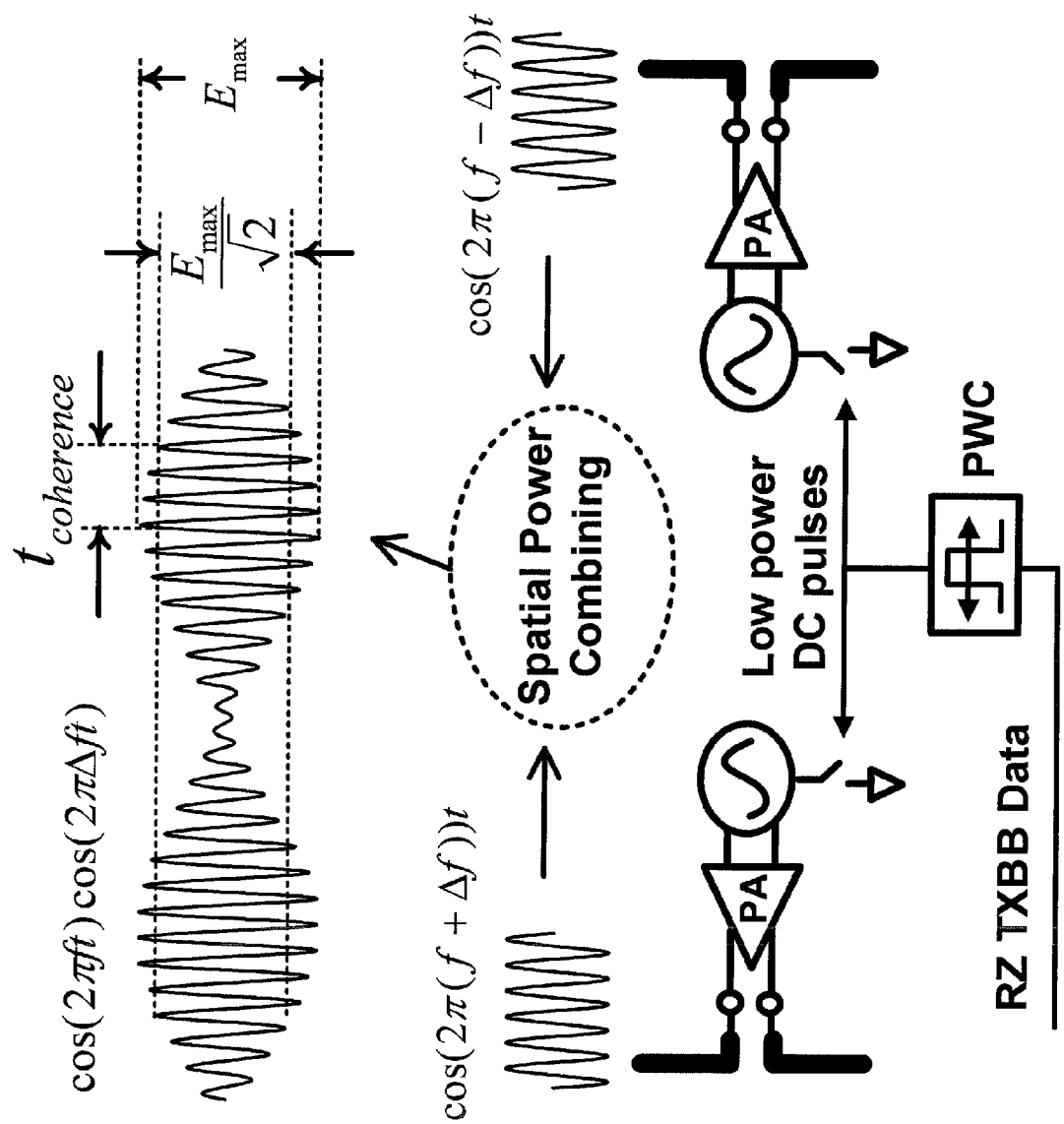
FIG. 7 shows timing graphs and block diagrams for two VCOs with a frequency difference, consistent with embodiments.

FIG. 7 shows timing graphs and block diagrams for two VCOs with a frequency difference, consistent with embodiments. Another consideration for OOK design is the frequency matching between the VCOs. When VCOs are open loop, their exact frequencies may not be known. In certain embodiments, a coarse (e.g., 2-bit) digital-to-analog (DAC) can be connected to the control voltage of a NMOS varactor pair to center the VCO frequency at a desirable channel, such as within the 57-64 GHz range. FIG. 7 illustrates the case in which the two VCOs have a frequency difference of 2Δf. The spatial power combining of the EM waves emanating from the two VCOs will form a beat with a frequency of Δf. We can define the coherence time, $t_{coherence}$, of the two VCOs as the time in which the spatially combined signal loses half its power. To find $t_{coherence}$, we have:

$$\cos(2\pi\Delta f t_{coherence}) = \frac{1}{\sqrt{2}} \Longrightarrow t_{coherence} = \frac{1}{8\Delta f} \quad (5)$$

The frequency of an LC oscillator is given by $$f = \frac{1}{2\pi\sqrt{LC}}$$

where L and C are the effective inductance and capacitance of the oscillator respectively. Considering the variation in the effective inductance, ΔL, is negligible compared to the variation in the effective capacitance, ΔC, the frequency variation can be simplified as:

$$|\Delta f| = \frac{1}{2}\frac{\Delta C}{C}f \quad (6)$$

By substituting (6) in (5), the coherence time of the VCOs is found to be:

$$t_{coherence} = \frac{1}{4f}\left(\frac{\Delta C}{C}\right)^{-1} \quad (7)$$

Figure 8:
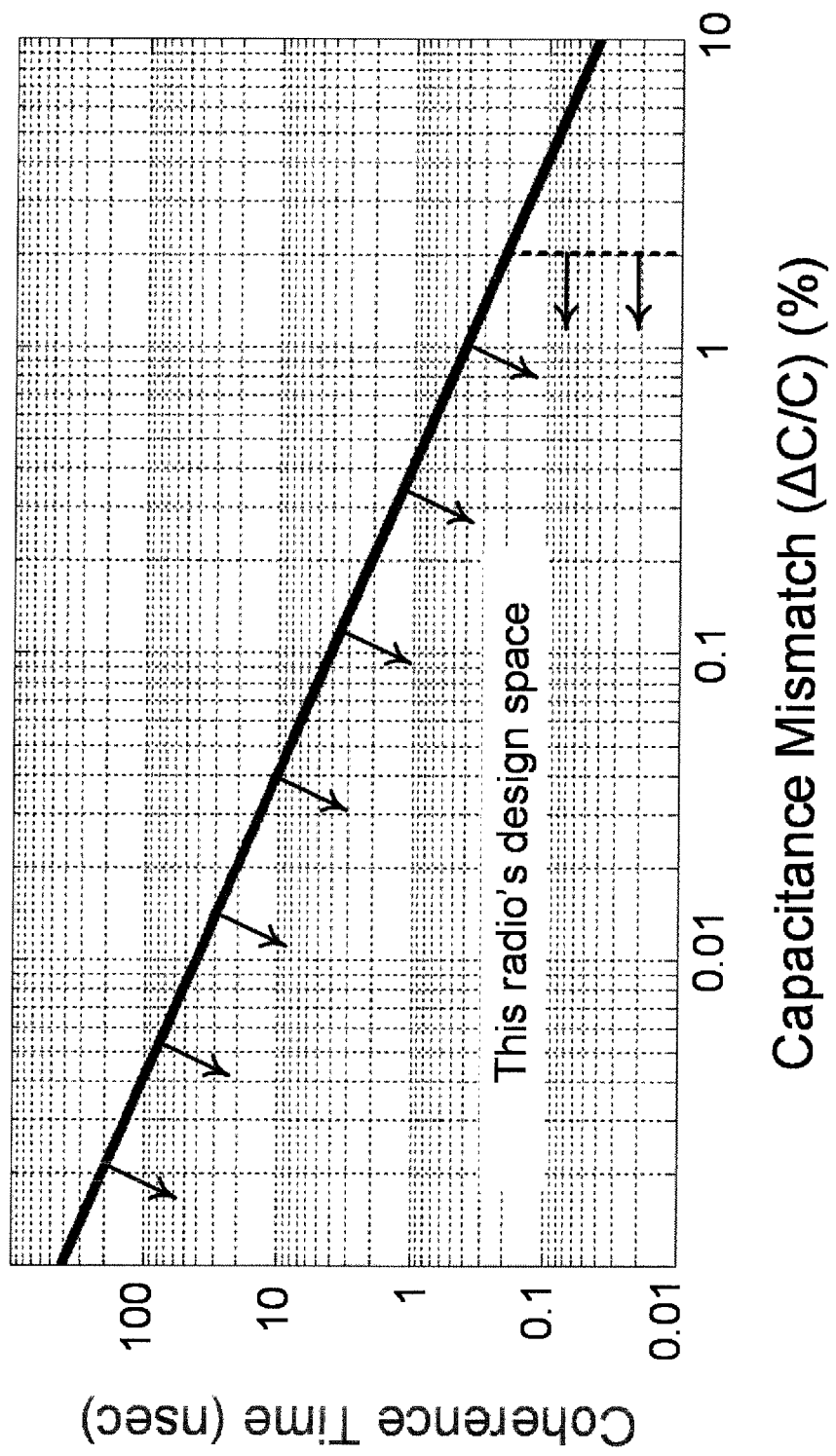
FIG. 8 shows coherence time as a function of the total variation of the VCO tank capacitance, consistent with embodiments of the present disclosure.

FIG. 8 shows coherence time as a function of the total variation of the VCO tank capacitance, consistent with embodiments of the present disclosure. This VCO capacitance is primarily, or even exclusively, due to the NMOS transistors which can have a lower statistical variation (of less than 5%), when compared to metal capacitors (about 20%).

Since OOK modulation has no linearity requirement, high-efficiency switching PAs can be used in the transmitter. A number of class E designs can be used at 60 GHz with either SiGe or CMOS processes. In a class E design, the active device can be treated as an ideal switch which gives an open circuit during its "off" mode and a perfect short-circuit during its "on" mode. With the operating frequency being a significant proportion of the device transit frequency ($f_T$), this ideal switching may not be achieved thus leading to a sub-optimal class E operation. On the other hand, a class $F^{-1}$ PA can rely on harmonic tuned loads to shape the output voltage and current waveforms. For example, FIG. 9A shows an ideal $F^{-1}$ PA implementation. The high Q resonators provide a short for $3^{rd}$, $5^{th}$ (odd) voltage harmonics while an open for all even harmonics. This results in non-overlapping transistor voltage and current waveforms as shown in FIG. 9B. In a practical implementation, these high Q resonators result in a significant area penalty as well as introduce extra loss in the output matching network.

Figure 9C:
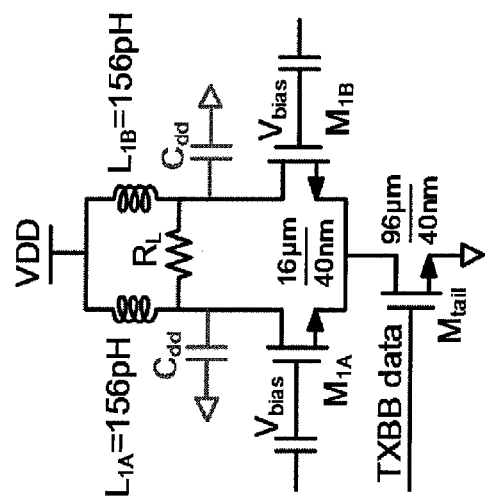
FIG. 9C shows a PA circuit implementation that resembles a class $F^{-1}$ PA in its operation, consistent with embodiments of the present disclosure.
Figure 9B:
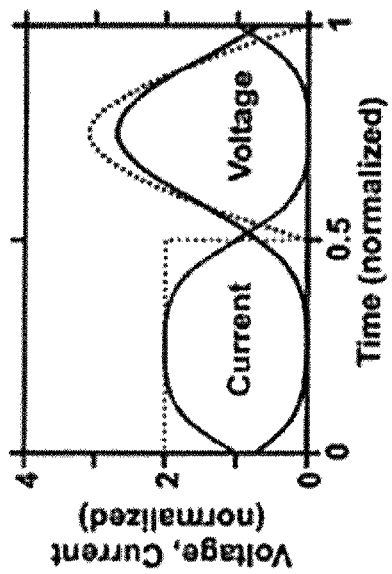
FIG. 9B shows non-overlapping transistor voltage and current waveforms, consistent with embodiments of the present disclosure.
Figure 9A:
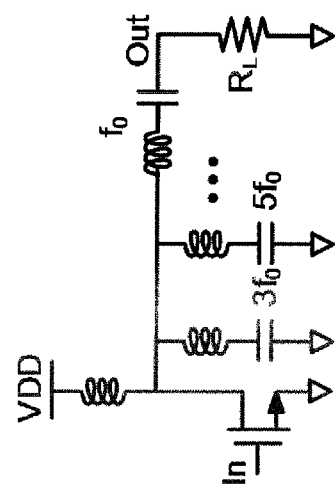
FIG. 9A shows an ideal $F^{-1}$ PA implementation, consistent with embodiments of the present disclosure.
Figure 10:
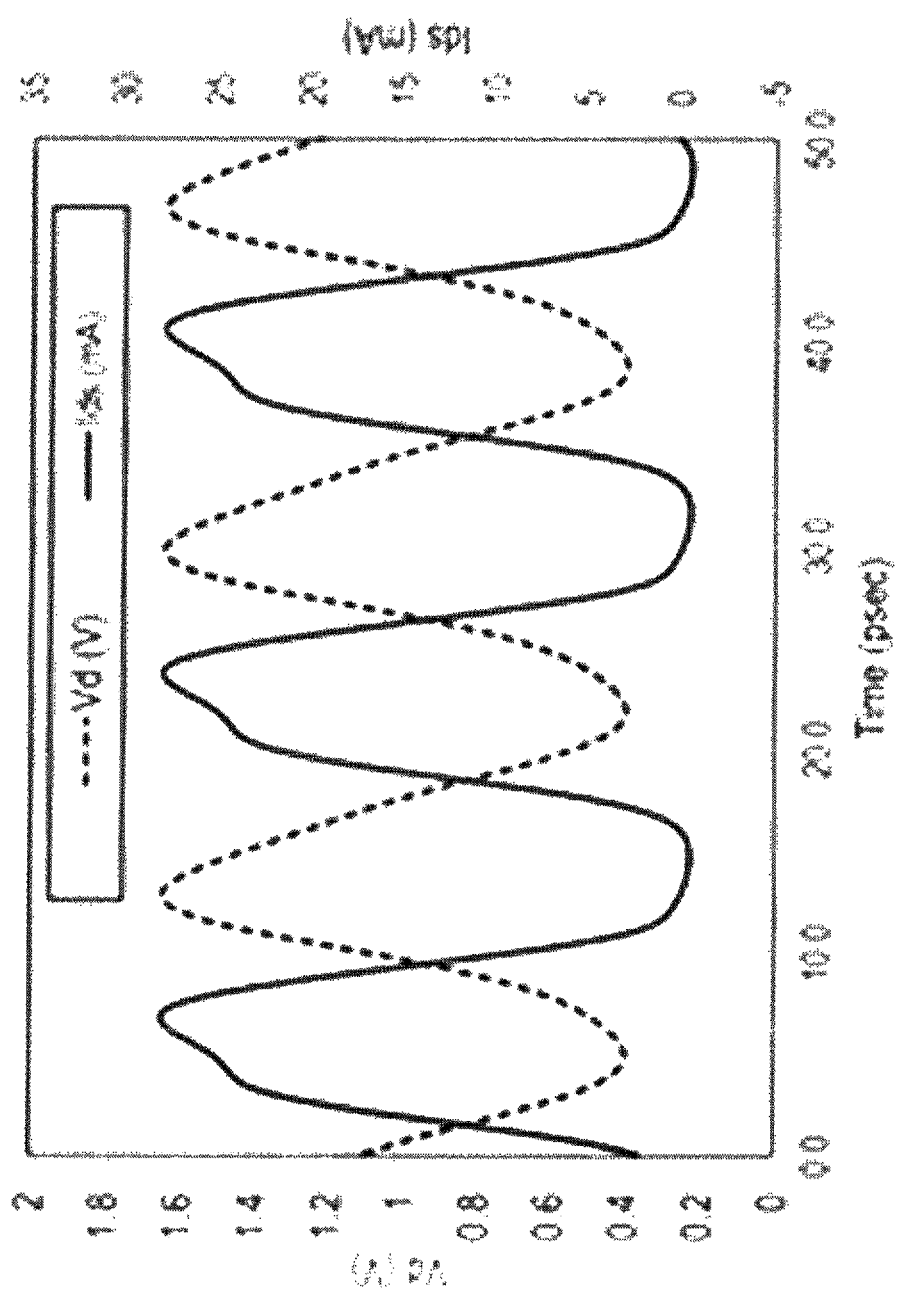
FIG. 10 shows the simulated drain voltage and current for the PA circuit of FIG. 9C, consistent with embodiments of the present disclosure.

An example of a PA circuit implementation that resembles a class $F^{-1}$ PA in its operation is shown in FIG. 9C. FIG. 10 shows the simulated drain voltage and current for the PA circuit of FIG. 9C, consistent with embodiments of the present disclosure. A comparison between the simulated drain voltage and current of the PA shown in FIG. 10 to the one in FIG. 9B supports the similarities to a class $F^{-1}$ PA. In this design, the choke inductor of a class $F^{-1}$ PA is replaced with the $L_{1A,B}$ in order to resonate out the effective drain capacitance, $C_{dd}$, of the input transistors at the fundamental frequency of 60 GHz. At higher odd harmonics, $C_{dd}$ is large enough that it nearly shorts the differential tank to the ground.

Figures 11A, 11B, 11C:
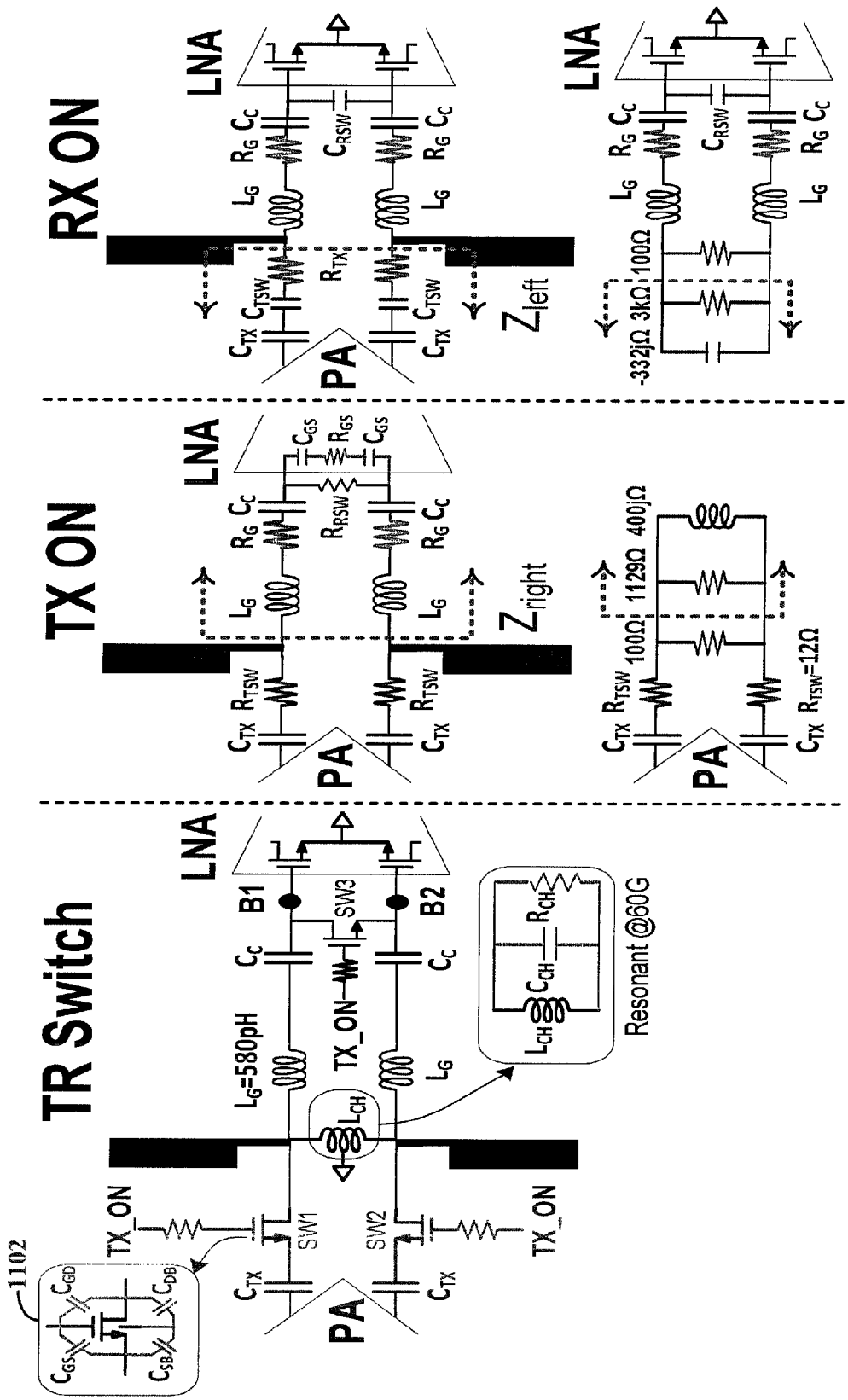
FIG. 11A shows a circuit diagram for a transmit/receive (TR) switch for using in a transceiver circuit, consistent with embodiments of the present disclosure.
FIG. 11B shows the equivalent circuit for when the transceiver (or "radio") is in transmit mode, consistent with embodiments of the present disclosure.
FIG. 11C shows an equivalent circuit for the transceiver while it is in receive mode, consistent with embodiments of the present disclosure.

In FIG. 9C, the gates of transistors $M_{1A}$ and $M_{1b}$ are biased at a nominal voltage of 700 mV by a 3-bit resistor digital to analog converter (DAC) (other DAC circuits are possible), while the drain is connected to a supply voltage of 1V. A tail transistor, $M_{tail}$, enables quick turn on/off of the PA during OOK operation. When turned on, the drain of $M_{tail}$ is pulled to a lower potential (about 100 mV). Thus the impact of $M_{tail}$ on the output swing is minimized. The inductors $L_{1A,B}$ are each 156 pH. Additional capacitors $C_{TX}$, as shown in FIG. 11A, can be added to resonate out the inductance of the on-chip dipole antenna. With an average dc power consumption of 12.1 mW, the PA can deliver 3.5 mW of power at 60 GHz to a 100Ω load, thus achieving a drain efficiency of 29%.

FIG. 11A shows a circuit diagram for a transmit/receive (TR) switch for using in a transceiver circuit, consistent with embodiments of the present disclosure. To maintain low cost and small silicon area, antennas can be shared between the receiver and transmitter blocks. The TR switch network shown in FIG. 11A can be used to isolate the differential input and output front-ends from each other. Inductor $L_{CH}$, as part of the TR switch, acts as an electrostatic discharge (ESD) protection device, hence, eliminating the need for a diode ESD protection that could otherwise present a large parasitic capacitance at 60 GHz. As shown in FIG. 11A, $L_{CH}$ self-resonates at 60 GHz and presents a parallel resistance of $R_{CH}$=3 kΩ between the dipole antenna differential input ports. Since the dipole antenna has an equivalent parallel radiation resistance of 100Ω, $R_{CH}$ is large enough not to load the dipole antenna in a meaningful manner.

FIG. 11B shows the equivalent circuit for when the transceiver (or "radio") is in transmit mode, consistent with embodiments of the present disclosure. As shown in FIG. 11B, when the radio is in the transmitting mode, low/minimum channel length NMOS transistors SW1, SW2, and SW3 are turned on by pulling their gate voltage to a high voltage value such as VDD=1V. In this mode, the drain and source DC voltages of SW1 and SW2 are at ground through the DC path provided by the choke inductor $L_{CH}$. In some embodiments, these switches could be relatively large so their on-resistance, $R_{TSW}$, is much smaller than the antenna impedance. It is noted, however, that in the receiving mode, it can be desirable to minimize the source-drain capacitances of SW1 and SW2. Accordingly, various embodiments use a switch size that takes both of these considerations into account (e.g., 32 μm/40 nm). Moreover, switch size can be selected so that it is large enough to meet the metal electromigration rule for at least 20 mA of DC current.

The parasitic model 1102 of SW1 is shown in FIG. 11A. Other switches can have the same parasitic model. A large resistor, for example, 5 kΩ, can be used at the gates of SW1 and SW2 so that their gate-source and gate-drain capacitances would not load the PA. For SW3, the drain and source voltage is also pulled to ground through a biasing network that pulls the voltage at nodes B1 and B2 to ground. As shown in FIG. 11B, when SW3 is on, the differential impedance on the right seen at the differential terminals of the dipole antenna is:

$$Z_{right} = 2L_G \omega j + 2R_G + \frac{2}{C_C \omega j} + R_{RSW} \left\| \left( \frac{2}{C_{GS} \omega j} + R_{GS} \right) \right. \quad (8)$$

where $R_{RSW}$ is the on-resistance of SW3, $R_G$ is the parasitic resistance of gate inductance $L_G$, $R_{GS}$ and $C_{GS}$ are the parasitic resistance and capacitance of the LNA input, and $C_C$=220 fF is an AC coupling cap. With a SW3 size of (4 μm/40 nm), the overall impedance of $$\frac{2j}{C_C \omega} + R_{RSW} \left\| \left( \frac{2}{C_{GS} \omega j} + R_{GS} \right) \right. \text{ equals } \left( 78 + \frac{1}{(72fF)\omega j} \right) \Omega.$$

With $L_G$=580 pH and a quality factor of 5, $Z_{right}$=1129Ω∥400jΩ at 60 GHz. The simplified equivalent circuit for $Z_{right}$ and the dipole parallel differential resistance of 100Ω is shown in FIG. 11B. The effective impedance seen by the PA is:

$$100\Omega \| 1129\Omega \| 400j\Omega = 91\Omega \| 400j\Omega \quad (9)$$

The imaginary part of (9) can be absorbed by the PA matching network. Therefore, the TR switch loss due to the loading of the LNA is: 10 log(91Ω/100Ω)=−0.85 dB. An extra simulated loss of 1 dB is due to the on-resistance of SW1/SW2. So the total TR switch loss is −1.85 dB.

FIG. 11C shows an equivalent circuit for the transceiver while it is in receive mode, consistent with embodiments of the present disclosure. As shown in FIG. 11C, in receive mode, NMOS transistors SW1, SW2, and SW3 are turned off by pulling their gate voltages to ground. The drain and source voltages of SW1 and SW2 are DC-coupled to ground through $L_{CH}$. When turned off, SW1 and SW2 present an effective parasitic drain-source capacitance, $C_{TSW}$, and an effective parasitic series resistance, $R_{TX}$. As shown in FIG. 11C, looking at the left of the dipole antenna, simulated at 60 GHz, the effective impedance is lower bounded as:

$$Z_{left} > 2R_{TX} + \frac{2}{C_{TSW} \omega j} = (36.3 - 328j)\Omega = 3k\Omega \| (-332j)\Omega \quad (10)$$

Therefore, the effective antenna impedance seen by the PA is lower bounded as: 100Ω∥$Z_{left}$=97Ω∥(−332j)Ω. The imaginary part of (10) can be absorbed by the LNA input matching network. The loss due to the TR switch during RX on is therefore: 10 log(97Ω/100Ω)=−0.3 dB.

Figure 12:
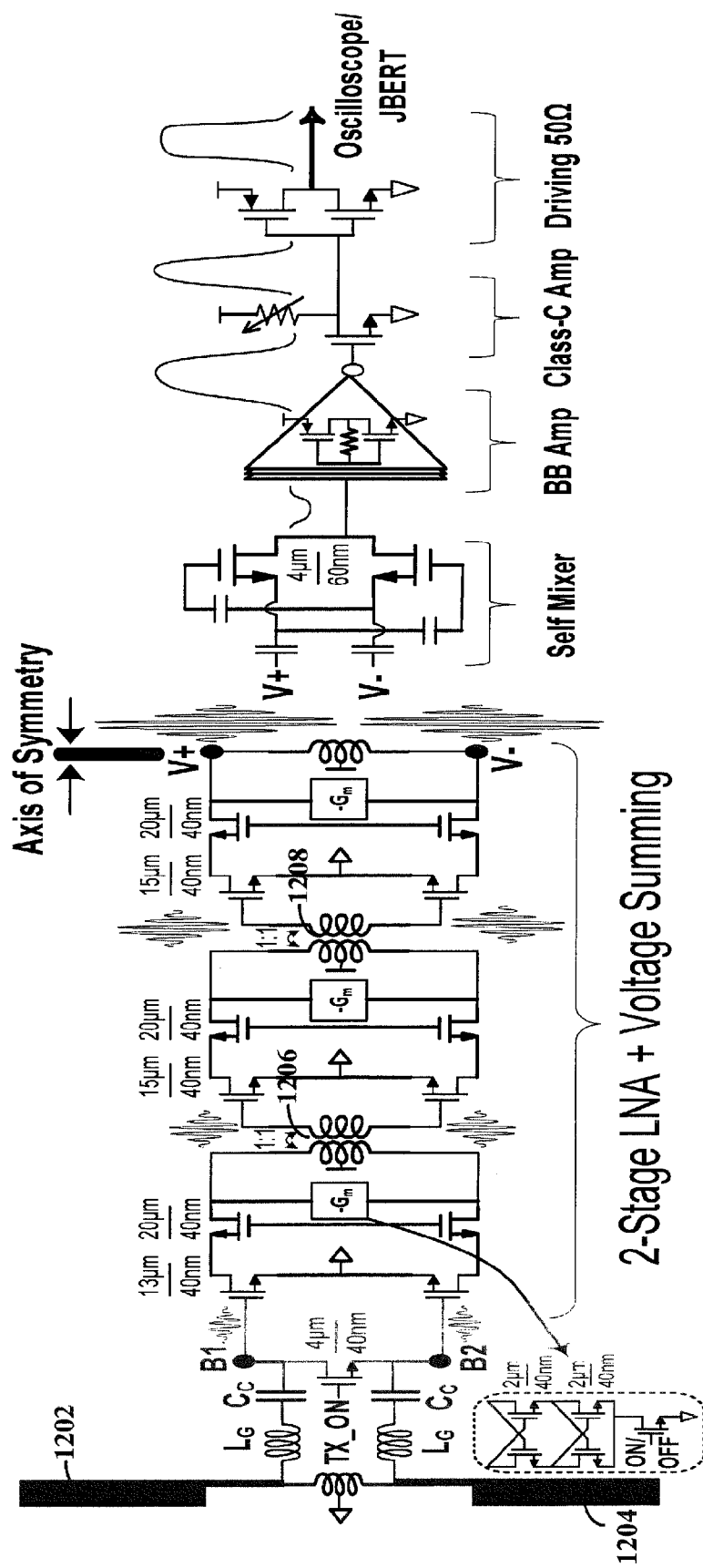
FIG. 12 shows a circuit diagram for a receiver portion of a transceiver, consistent with embodiments of the present disclosure.

FIG. 12 shows a circuit diagram for a receiver portion of a transceiver, consistent with embodiments of the present disclosure. FIG. 12 shows two LNAs for the two dipole antennas 1202 and 1204. Each LNA includes of two stages that are coupled by transformers 1206, 1208. The third stage is common between the two paths and sums the output voltages of the two LNAs. This summing can be useful for improving the receiver sensitivity (e.g., by 3 dB). It can also be useful for providing additional (e.g., 6 dB) voltage gain. A common source amplifier can be used for the LNA's front-end stage. The choice is partially driven by the fact that the antenna is being shared between the LNA and PA. If the LNA used a separate antenna, a source degeneration LNA could have given a lower noise figure (NF). But in this case, the overall link budget was improved as the common source LNA caused less PA loss than it caused the increase in NF. There are other reasons for using a common source LNA. First, inductor degeneration can reduce the gain of the first stage, increasing the NF contribution of the later stages. In this design, the NF of the self-mixing stage and the chain of the baseband amplifiers can be significantly higher than the LNA. Therefore, it can be desirable to have high gain at the LNA stages as the noise contribution of the post LNA stages will be divided by the overall LNA gain. Moreover, for low power LNA design where the input NMOS transistors are small, the effective resistance of the NMOS input transistor in series with its gate capacitance can be sizable. In an example implementation of an operating gate voltage of 0.7V, the series gate resistance and capacitance of a differential NMOS pair can be 67Ω and 6.1 fF (33.5Ω and 12.2 fF single-ended). This impedance can be matched to a 100Ω differential antenna. A gate inductance, $L_G$, of 580 pH resonates out the gate capacitance at 60 GHz. With a Q of 5, the parasitic series resistance of $L_G$ equals 43Ω. Therefore, the total impedance seen by the antenna at 60 GHz is 67Ω+2×43Ω=153Ω. This results in a $S_{11}$ of lower than −10 dB.

Figure 13:
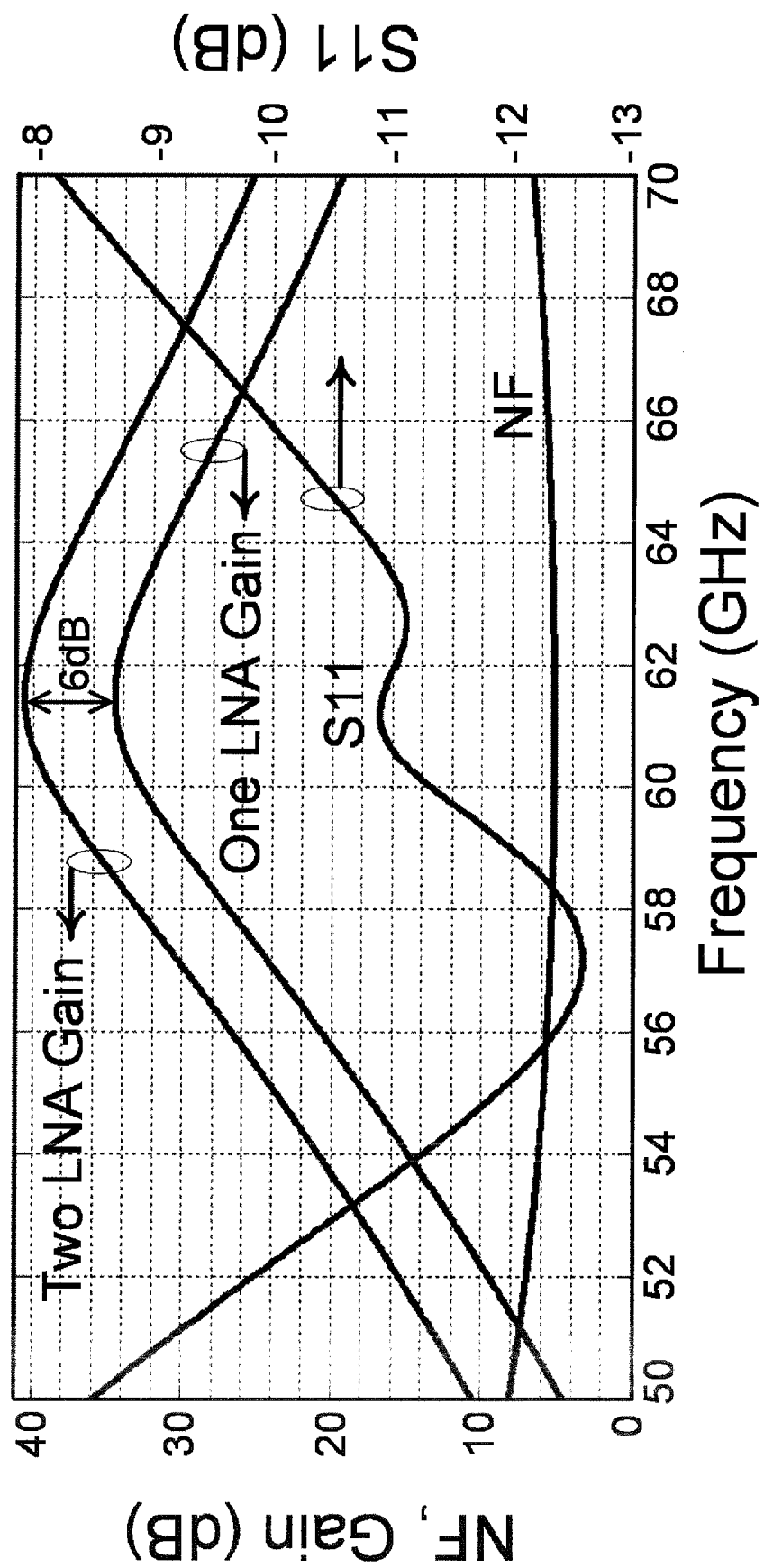
FIG. 13 shows the simulation results for the LNA NF, gain and $S_{11}$ of FIG. 12, consistent with embodiments of the present disclosure.

FIG. 13 shows the simulation results for the LNA NF, gain and $S_{11}$ of FIG. 12, consistent with embodiments of the present disclosure. The return loss maintain lower than −10 dB from 52 GHz to 66 GHz. The NF is below 6 dB from 54 GHz to 66 GHz with a minimum of 5.2 dB at around 60 GHz. The maximum overall gain of the two LNAs is 40.5 dB simulated at the output of the voltage summation circuit. Each LNA path has a simulated gain of 34.5 dB. The first, second and third LNA stages have voltage gains of 10.6 dB, 11.5 dB, and 9.4 dB. There is additional 3 dB gain due to the input matching Q boosting. All input transistors of the LNA stages are biased by a 3-bit resistor DAC. The cascode transistors are biased to the voltage supply. The total power consumption of the two LNAs is programmable from 38 mW to 72 mW. The simulated NF was achieved at a 48 mW total power consumption. As shown in FIG. 12, each LNA stage included stacked cross-coupled NMOS transistors to provide negative resistance. This can be useful for boosting the LNA gain. The NF of the receiver chain is largely dominated by the envelope detector mixer and the following BB amplifiers so increasing the gain of the LNA stages results in a lower overall NF. However, during the measurement, the negative resistance resulting in oscillation so they were kept off during the experimental testing.

The output of the voltage summation stage feeds a passive AC-coupled self-mixer to extract the OOK modulation envelope, as shown in FIG. 12. The drain and source bias voltage for the mixer transistors is provided by the self-biased inverter that follows the mixer. The gate bias is at one threshold voltage above the source-drain voltage. This can allow for the transistors to be biased at near threshold for maximum RF to BB gain. Because of the non-linear nature of the envelope detector mixer, its NF is a very strong function of the RF input voltage. The receiver baseband is a 3-stage DC-coupled inverter chain with resistive feedback followed by a common-source amplifier with programmable resistive load. The last stage drives an external 50Ω load. The NF of the mixer and the baseband chain was simulated to be 40 dB when the RF input at 60 GHz is at the sensitivity level.

At mm-wave frequencies, on-chip antennas are viable options as the wavelength is comparable to the die size of a complex transceiver design. Furthermore, on-chip antennas can reduce or eliminate the loss due to the interconnect techniques such as wire-bond, wafer-level-packaging (WLP), ball-grid-array (BGA), and others. The low resistivity of the silicon substrate (10 Ω-cm) can introduces electric field losses leading to a reduction in antenna efficiency and radiation resistance. Also, the high permittivity of the silicon substrate ($\varepsilon_r$=11.9) can result in the absorption of the fields in the substrate thus giving rise to undesirable substrate modes that adversely impacts the antenna efficiency. The two possible techniques to improve antenna efficiency involve using a substrate dielectric lens and substrate thinning. The di-electric lens is large, expensive, and needs accurate placement with respect to the on-chip antenna. On the other hand, die thinning is a one-time process and can be performed at the wafer level to reduce the cost for mass fabrication.

Figure 14A:
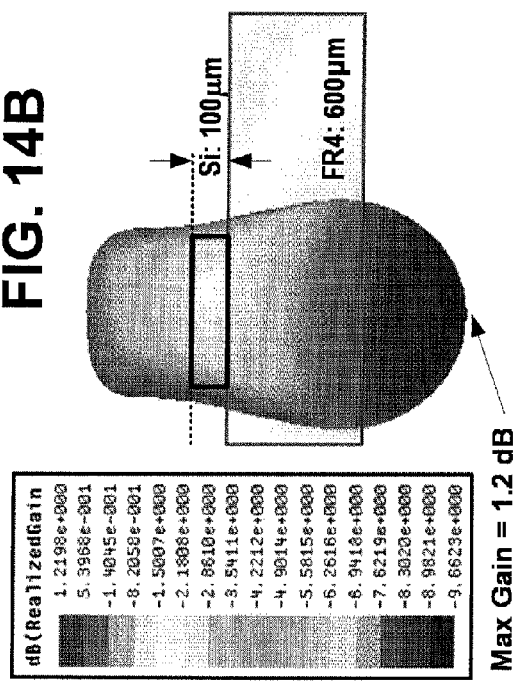
FIG. 14A depicts the results of simulations for antenna gain of a dual dipole with metal reflector, consistent with embodiments of the present disclosure.
Figure 14B:
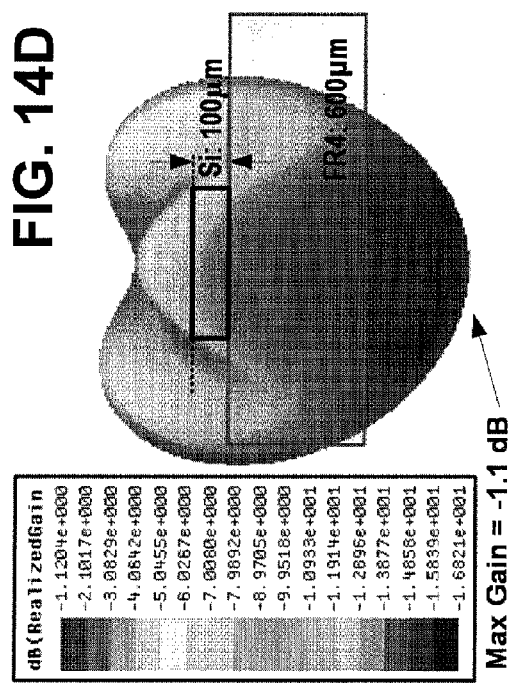
FIG. 14B depicts the results of simulations for antenna gain of a dual dipole without metal reflector, consistent with embodiments of the present disclosure.
Figure 14C:
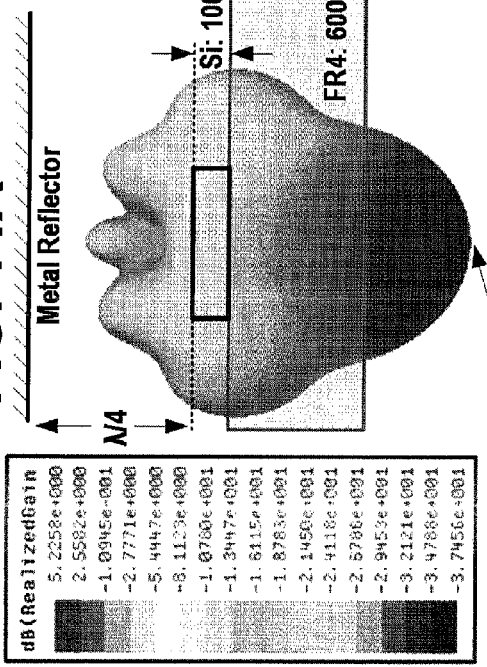
FIG. 14C depicts the results of simulations for antenna gain of a single dipole with metal reflector, consistent with embodiments of the present disclosure.
Figure 14D:
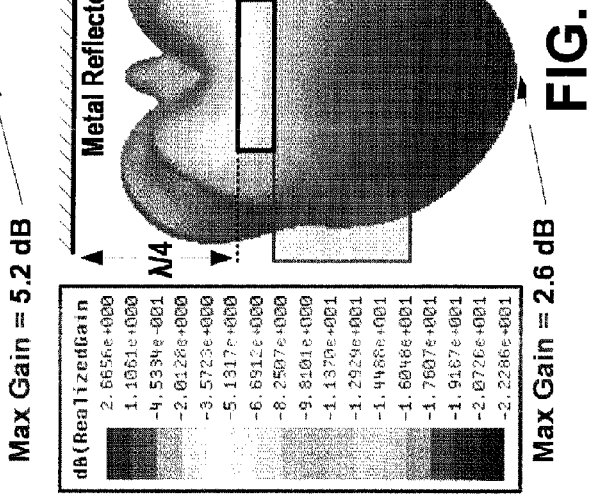
FIG. 14D depicts the results of simulations for antenna gain of a single dipole without metal reflector, consistent with embodiments of the present disclosure.
Figure 15A:
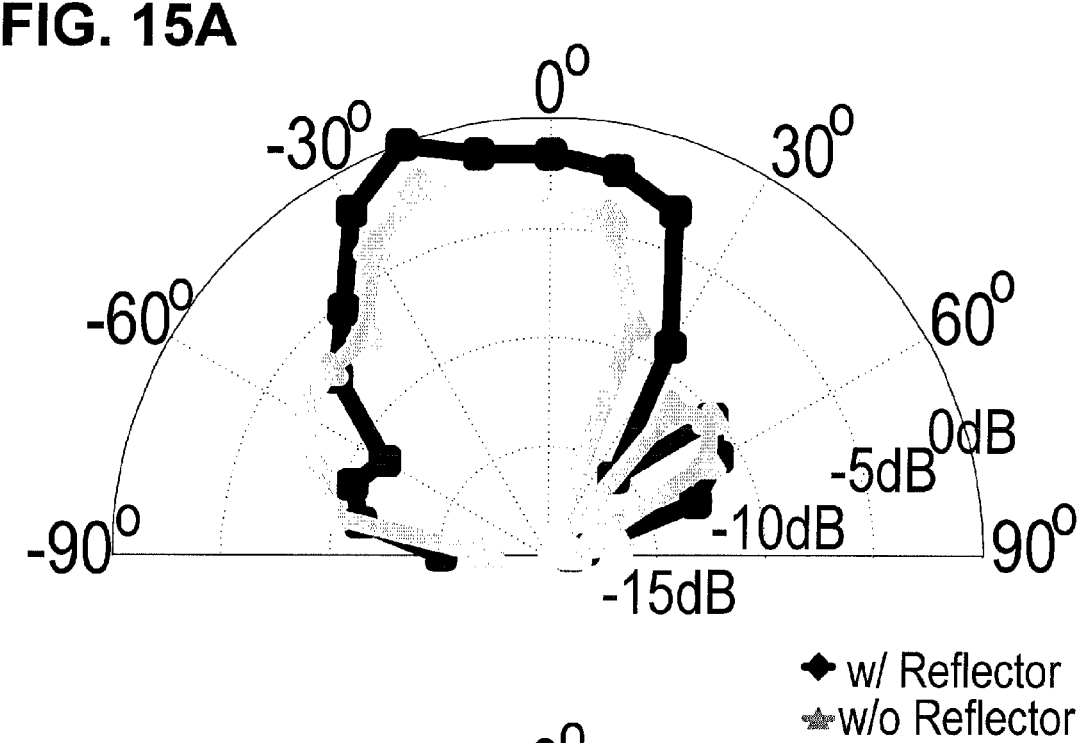
FIG. 15A shows the normalized radiation patterns for elevation of simulations for an antenna with and without metal reflector, consistent with embodiments of the present disclosure.
Figure 15B:
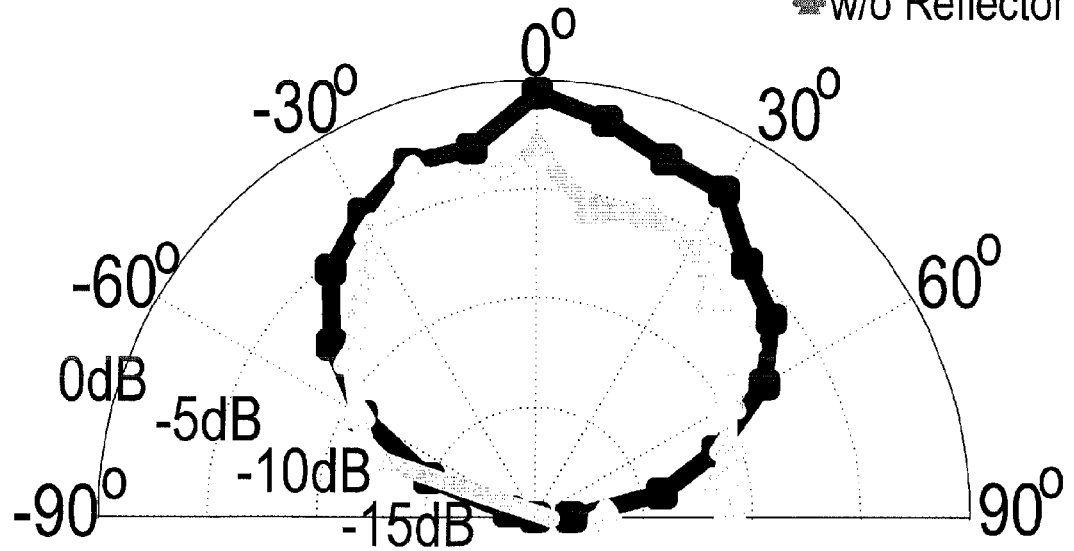
FIG. 15B shows the normalized radiation patterns for azimuth of simulations for an antenna with and without metal reflector, consistent with embodiments of the present disclosure.

FIG. 14A depicts the results of simulations for antenna gain of a dual dipole with metal reflector (e.g., consistent with FIGS. 20-23), consistent with embodiments of the present disclosure. FIG. 14B depicts the results of simulations for antenna gain of a dual dipole without metal reflector, consistent with embodiments of the present disclosure. FIG. 14C depicts the results of simulations for antenna gain of a single dipole with metal reflector, consistent with embodiments of the present disclosure. FIG. 14D depicts the results of simulations for antenna gain of a single dipole without metal reflector, consistent with embodiments of the present disclosure. FIG. 15A shows the normalized radiation patterns for elevation of simulations for an antenna with and without metal reflector, consistent with embodiments of the present disclosure. FIG. 15B shows the normalized radiation patterns for azimuth of simulations for an antenna with and without metal reflector, consistent with embodiments of the present disclosure. The simulations suggest that a metal reflector improves the overall antenna gain by about 4 dB. The radiation patterns for the dual dipole antennas and the single dipole antenna are shown in FIG. 14 with and without the metal reflector.

Figure 16:
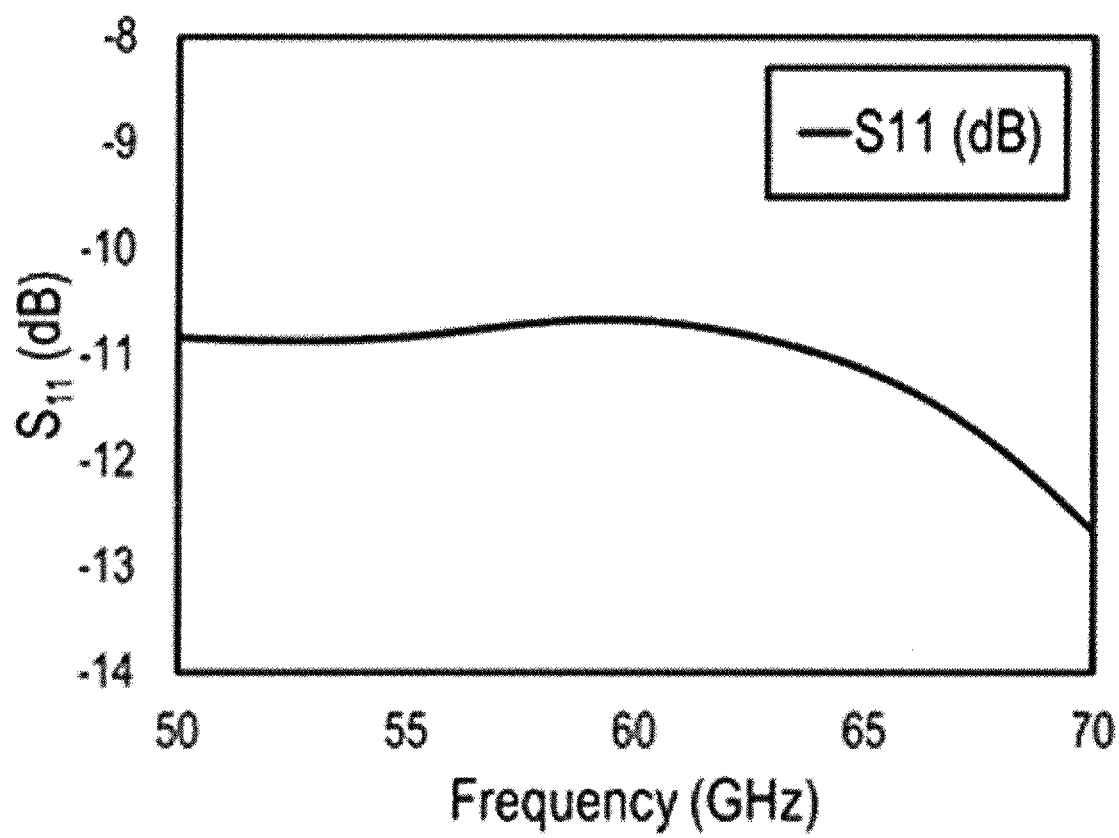
FIG. 16 shows the simulated $S_{11}$ from HFSS, consistent with embodiments of the present disclosure.

FIG. 16 shows the simulated $S_{11}$ from HFSS, consistent with embodiments of the present disclosure. The simulation of FIG. 16 indicates a bandwidth of greater than 20 GHz. The simulations were made based upon a silicon chip with the dipole antennas that sits over a FR4 PCB material that was 600 μm thick. The radiation was taken from the PCB side. This is because the electromagnetic fields tend to go through the materials with higher dielectric constant than the air. The choice of the FR4 material is not limiting, but such a choice may be made due cost considerations. It is recognized that there are other PCB materials with lower (or higher) loss at 60 GHz that can be used. The overall efficiency of the dipole antenna over the PCB was 45%. For the silicon the dielectric constant and the loss tangent is assumed to be 11.9 and 0.65 respectively. For the PCB, the dielectric constant and loss tangent is 3.8 and 0.02 respectively.

Figure 17:
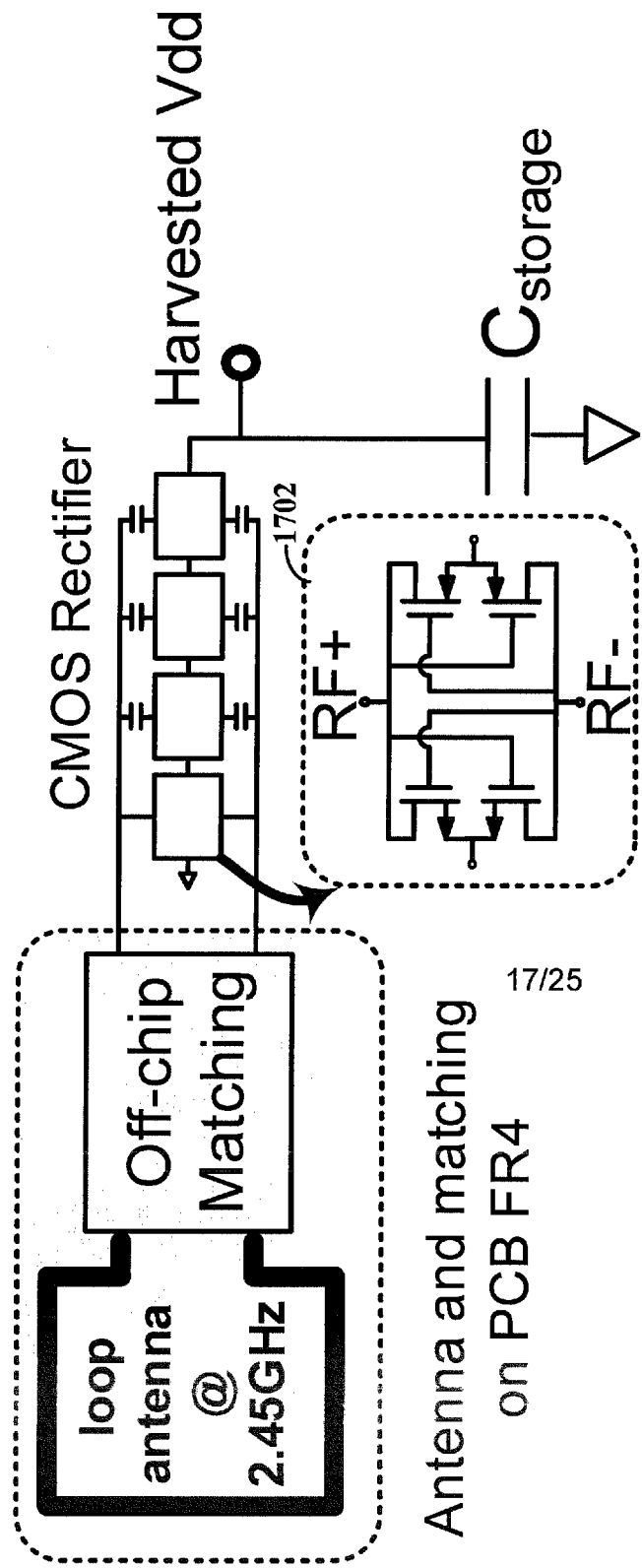
FIG. 17 shows a circuit diagram for use in harvesting energy from a received RF signal, consistent with embodiments of the present disclosure.

FIG. 17 shows a circuit diagram for use in harvesting energy from a received RF signal, consistent with embodiments of the present disclosure. The energy harvesting circuit depicted in FIG. 17 includes a CMOS rectifier circuit that includes four stages of cascaded CMOS rectifiers. The input of the rectifier circuit can be connected to a loop antenna on the PCB, through a shunt-series capacitor matching network, which harvests RF energy at 2.45 GHz. The output can be connected to an on-chip 3 nF capacitor that can be used to store harvested energy. With four stages of rectification, a nominal output voltage of 1.1V can be achieved. In particular embodiments, each rectifier stage 1702 can include two NMOS/PMOS transistor pairs that are successively turned on and off by the incoming RF sinusoid thereby pumping the charge to the storage cap.

FIG. 18A shows the state diagram for supply detection circuit, consistent with embodiments of the present disclosure. Since the rectifier output voltage can vary with 2.45 GHz RF input power level as well as load current, a supply detection circuit can be used to ensure that the supply remains at a level high enough for the transmitter to operate properly. At block 1082, RF energy is received by the device (e.g., at 2.5 GHz). A rectifier circuit can then provide an output supply voltage using the received RF energy, per block 1804. A determination can be made as to whether or not the supply voltage is above a threshold level (e.g., 1.1V), per block 1806. If not, then the transmitter circuit can be disabled, or "off," per block 1808. If the supply voltage is above the threshold voltage, the transmitter can be enabled, or "on," per block 1810. A determination can be made as to whether or not the supply voltage has dropped below a second threshold voltage, per block 1812. If not, the transmitter can remain on. If so, the transmitter can be turned off.

FIG. 18B shows a graph of supply voltage with a hysteresis for the transmitter enable and disable control, consistent with embodiments of the present disclosure. In some instances, the two threshold values, corresponding to blocks 1806 and 1812, can be set at the same value. In other instances they can be different values so as to provide hysteresis, which can be useful for avoiding oscillation and inadequate turn on times. For instance, by setting the first threshold voltage higher (e.g., 1.1V) than the voltage necessary to maintain proper circuit function (e.g., 0.8V), there can be sufficient time for a full transmit operation to complete before the supply drops below the lower level. The particular hysteresis can be set based upon parameters such as the storage capacitor size and expected power draw of the transmitter. As shown in FIG. 18B, the transmitter will alternate between on and off so long as the transmitter is drawing more port than is provided by the harvest circuit.

FIG. 18C shows a graph of supply voltage where there is sufficient harvest voltage available, consistent with embodiments of the present disclosure. As shown in FIG. 18C when the harvested energy is more than what the transmitter draws, the transmitter can operate continuously. The power provided and drawn transmission power may change over time leading to either or both of the situations shown in FIG. 18B and FIG. 18C to occur.

Figure 19:
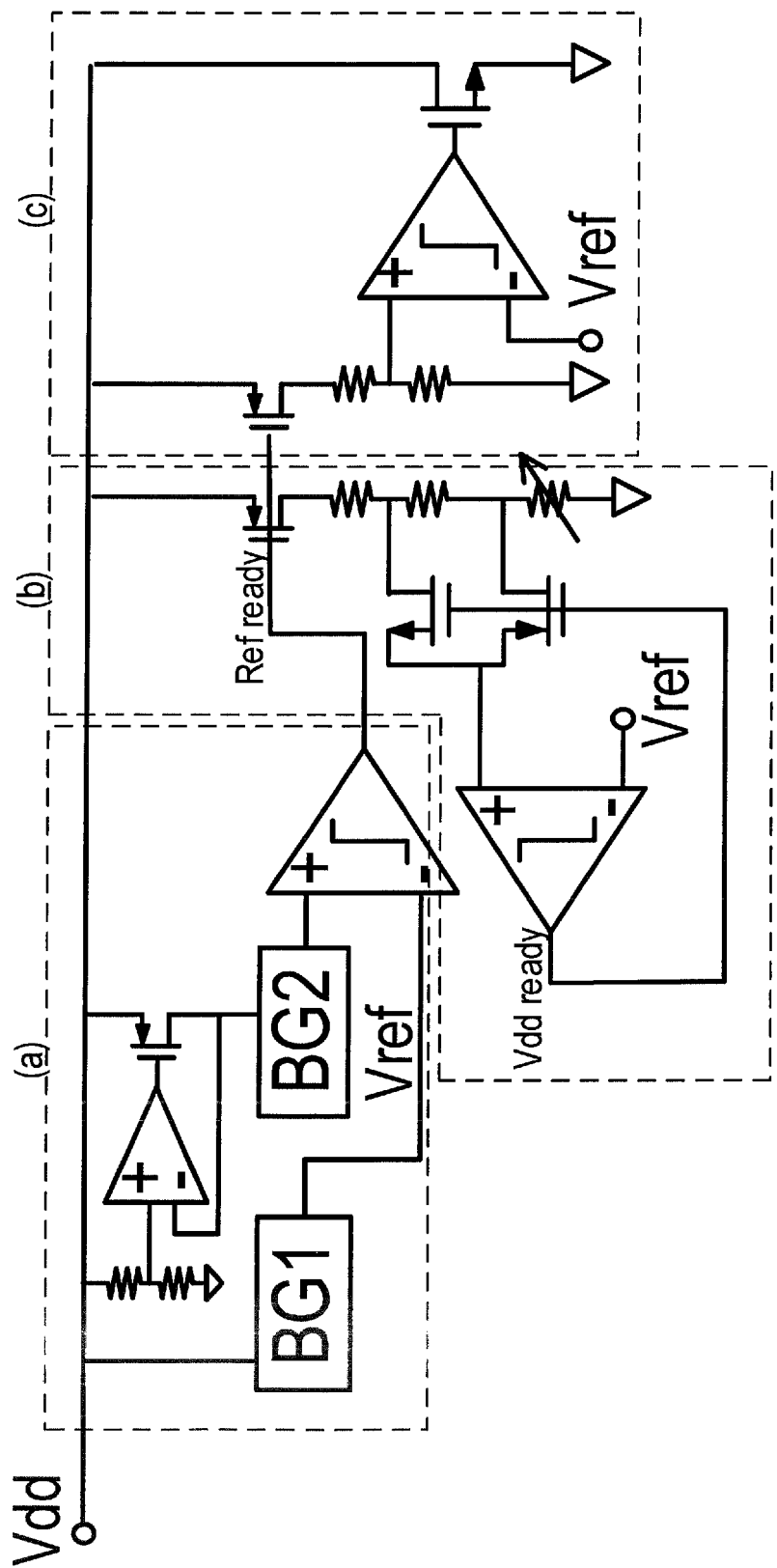
FIG. 19 shows a circuit diagram for a supply detection circuit, consistent with embodiments of the present disclosure.

FIG. 19 shows a circuit diagram for a supply detection circuit, consistent with embodiments of the present disclosure. Block (a) of FIG. 19 uses two bandgap circuits (BG1 and BG2) to detect reference voltage settling during VDD ramp up. The first bandgap (BG1) directly connects to VDD and generates a reference voltage Vref (e.g., 0.50V), whereas the second bandgap (BG2) operates from a partial VDD voltage (e.g., 0.75 VDD) and generates a higher output reference than BG1 (e.g., 0.55V). Since BG2 is running from a lower supply, it will settle later than BG1 when VDD is ramping up. Once BG2 output exceeds Vref a comparator issues 'Ref ready' signal. Block (b) of FIG. 19 includes a Schmitt trigger circuit that is used for the supply level detection. Block (c) of the circuit of FIG. 19 is configured to apply a leakage load current to the supply whenever VDD exceeds 1.3V. This can provide over voltage protection, as may occur where too much harvested energy is available.

Figure 20:
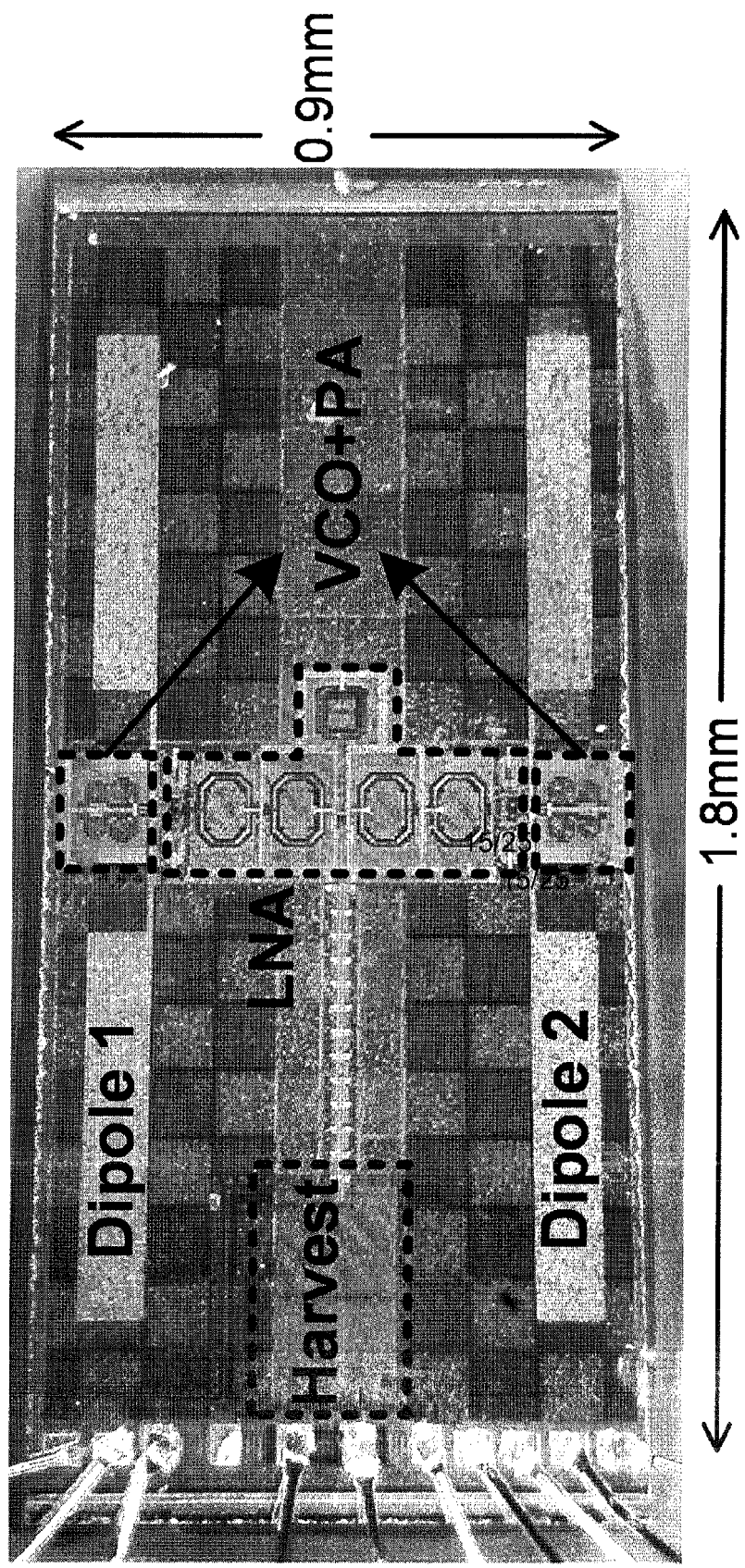
FIG. 20 shows a die micrograph and corresponding dimensions, consistent with embodiments of the present disclosure.

FIG. 20 depicts an integrated circuit (IC) chip with on-chip antennas, consistent with embodiments of the present disclosure. The depicted chip includes two dipole elements on top aluminum layer with a separation of $0.12\lambda$ where $\lambda=5$ mm is the free space wavelength at 60 GHz. The separation distance between the two antennas can be adjusted according to the particular system parameters and as a function of $\lambda$. For instance, the distance could be set to $\frac{1}{2}\lambda$, $\frac{1}{10}\lambda$, $\frac{1}{20}\lambda$ and distances within this range. There is coupling between the two antenna elements, which can be accounted for by a co-design of the two dipoles. To meet the metal density rule, a patterned floating shield on the two top copper metal layers was placed below the dipole antennas. The area under the shield can be used for digital circuits as well as for energy storing capacitors for the harvest block. To reduce the loss due to the substrate, the dipole elements can be placed very close to the edge of the chip, and the silicon can be thinned (e.g., to 100 μm). Also, a metal reflector can be placed at a distance of quarter wavelength from the antenna. According to embodiments, a $0.9\times1.8$ mm$^2$ chip including two on-chip dipole antennas can be fabricated in TSMC 40 nm GP technology with 9 metal layers. The measurements include a metal reflector for both the RX and TX.

FIGS. 21A-21F depict various on-chip antenna configurations for quad-flat no-leads (QFN) packaging, consistent with embodiments of the present disclosure. Each of the figures shows an example of how on-chip antennas should be packaged to obtain the high gain and directivity. The metal plate/reflector (shown by hatching) 2102 represents a metal (or other conductor) that can be used as a reflector for the mmWave antennas 2104. The material of this reflector can be made of various different high conductance material, such as various metals. These figures show various ways of doing the packaging with a QFN packaging technology, although various other packaging technologies can also be used. In FIG. 21A, the outer surface of the package casing is metal plated. According to embodiments, the chip package can be placed within a device having an electronic cover/casing, the backside of which is shown by 2106. The distance between the antenna and the front of the casing is indicated by "d" and the back of the casing as "h". The permittivity and thickness of the upper package casing gate, chip substrate, package substrate, and lower package casing gap are indicated by $\varepsilon_1 t_1$, $\varepsilon_2 t_2$, $\varepsilon_3 t_3$, and $\varepsilon_4 t_4$, respectively. According to embodiments, the distance h can be determined by:

$$\frac{n\lambda}{2} - \frac{\lambda}{8} < h < \frac{n\lambda}{2} + \frac{\lambda}{8} (n = 0, 1, 2, 3, \ldots)$$

According to embodiments, the distance between the on-chip antennas and the reflector is $$\frac{\lambda}{4}.$$

In embodiments, this distance could be varied according to the following relationship:

$$\frac{n\lambda}{2} + \frac{\lambda}{8} < d < \frac{n\lambda}{2} + \frac{3\lambda}{8} (n = 0, 1, 2, 3, \ldots)$$

$$\frac{n\lambda}{2} + \frac{\lambda}{8} < D < \frac{n\lambda}{2} + \frac{3\lambda}{8} (n = 0, 1, 2, 3, \ldots)$$

Where, $\lambda$, is the wavelength of the mmWave inside the material that lies between the on-chip antennas and the (metal) reflectors. For example, the wavelength of the mmWave in air is:

$$\lambda = \frac{c}{f\sqrt{\varepsilon}}$$

Where $c=3\times108$ (m/s) is the speed of the electromagnetic (EM) wave in the air, f is the mmWave frequency, and $\varepsilon$ is the permittivity of the material. If there are n layers of different materials between the antennas and the reflector, the effective permittivity is given by:

$$\varepsilon = \frac{1}{\sum_{i=1}^{n} t_i \sum_{i=1}^{n} \frac{1}{\varepsilon_i t_i}}$$

Where $\varepsilon_i$ is permittivity of the $i^{th}$ layer.

In FIG. 21B, the inner surface of the package casing is metal plated. In FIG. 21C, the entire outer surface of the package casing is metal plated. In FIG. 21D, the entire inner surface of the package casing is metal plated. In FIG. 21E, the bottom of the package casing is metal plated and selective sides on the outer surface are also plated. In FIG. 21F, the bottom of the package casing is metal plated and selective sides on the inner surface are also plated.

Figure 22A:
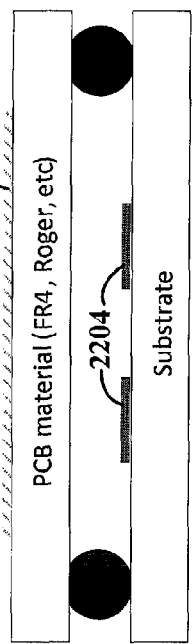
FIGS. 22A-22F depict various on-chip antenna configurations for wafer level packaging (WLP), consistent with embodiments of the present disclosure.
Figure 22B:
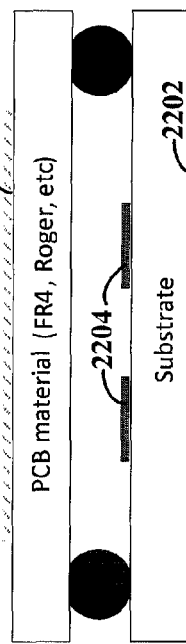
Figure 22C:
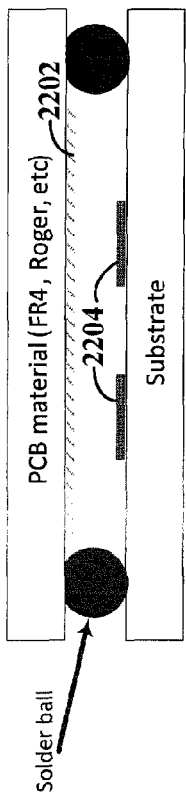
Figure 22D:
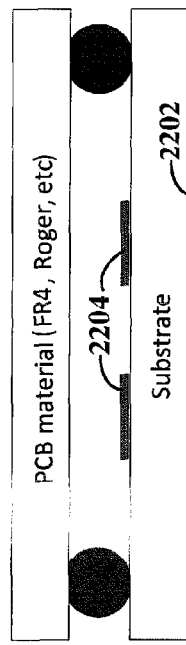
Figure 22E:
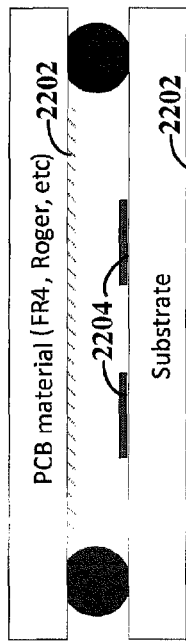
Figure 22F:
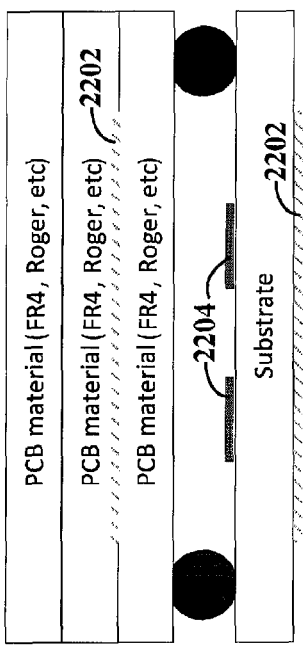

FIGS. 22A-22F depict various on-chip antenna configurations for wafer level packaging (WLP), consistent with embodiments of the present disclosure. Each of the figures shows an example of how on-chip antennas should be packaged to obtain the high gain and directivity. The metal plate/reflector (shown by hatching) 2202 represents a metal (or other conductor) that can be used as a reflector for the mmWave antennas 2204. A discussed above, the material of this metal reflector can be made of various different high conductance material, such as metals. In FIG. 22A, there is a metal plate 2202 on the PCB surface that faces the chip substrate. In FIG. 22B, the metal plate 2202 is located on the PCB outer surface of the PCB. In FIG. 22C, the metal plate 2202 is located on the surface of the silicon substrate. In FIG. 22D, the metal plate 2202 is located on the outer surfaces of the PCB and silicon substrate. In FIG. 22E, the metal plate 2202 is located on the PCB surface facing the chip and on the outer surface of silicon substrate. In FIG. 22F, the metal plate 2202 is located on the inside of the PCB laminate and on the outer surface of the silicon substrate.

Figure 23B:
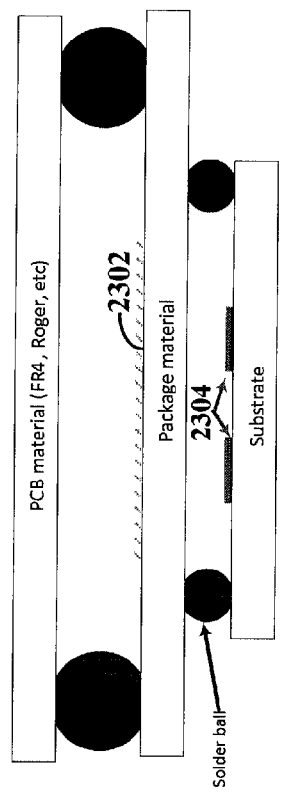
FIGS. 23A-23D depict various on-chip antenna configurations for flip-chip (FC) packaging, consistent with embodiments of the present disclosure.
Figure 23D:
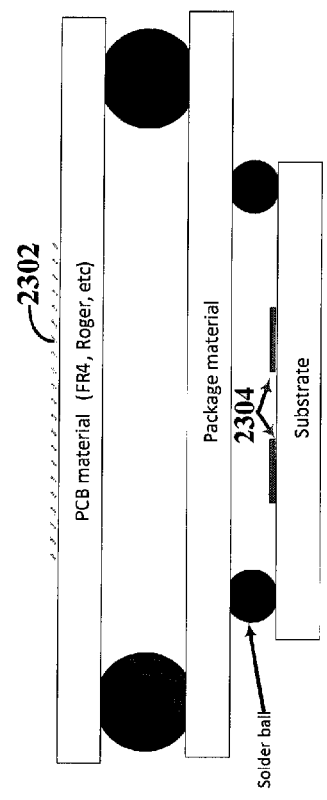
Figure 23A:
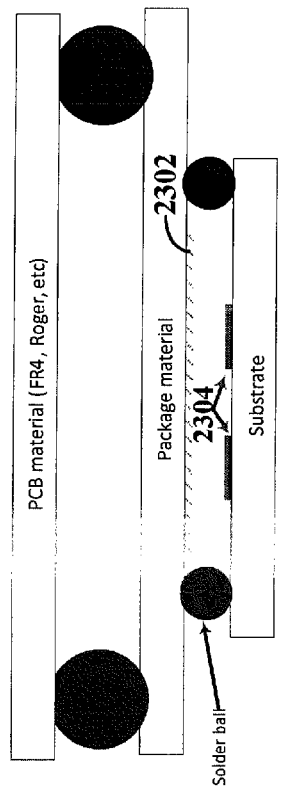
Figure 23C:
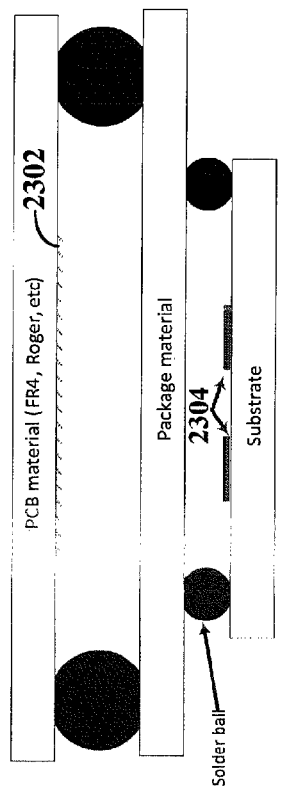

FIGS. 23A-23D depict various on-chip antenna configurations for flip-chip (FC) packaging, consistent with embodiments of the present disclosure. The metal plate/reflector (shown by a hatching) 2302 represents a metal (or other conductor) that can be used as a reflector for the mmWave antennas 2304. In FIG. 23A, there is a metal plate 2302 on the surface of the FC package that is facing the substrate. In FIG. 23B, there is a metal plate 2302 on the surface of the FC package that is facing away from the substrate. In FIG. 23C, there is a metal plate 2302 on the surface of the PCB that is facing the FC package. In FIG. 23D, there is a metal plate 2302 on the surface of the PCB that is facing away from the FC package.

Figure 24:
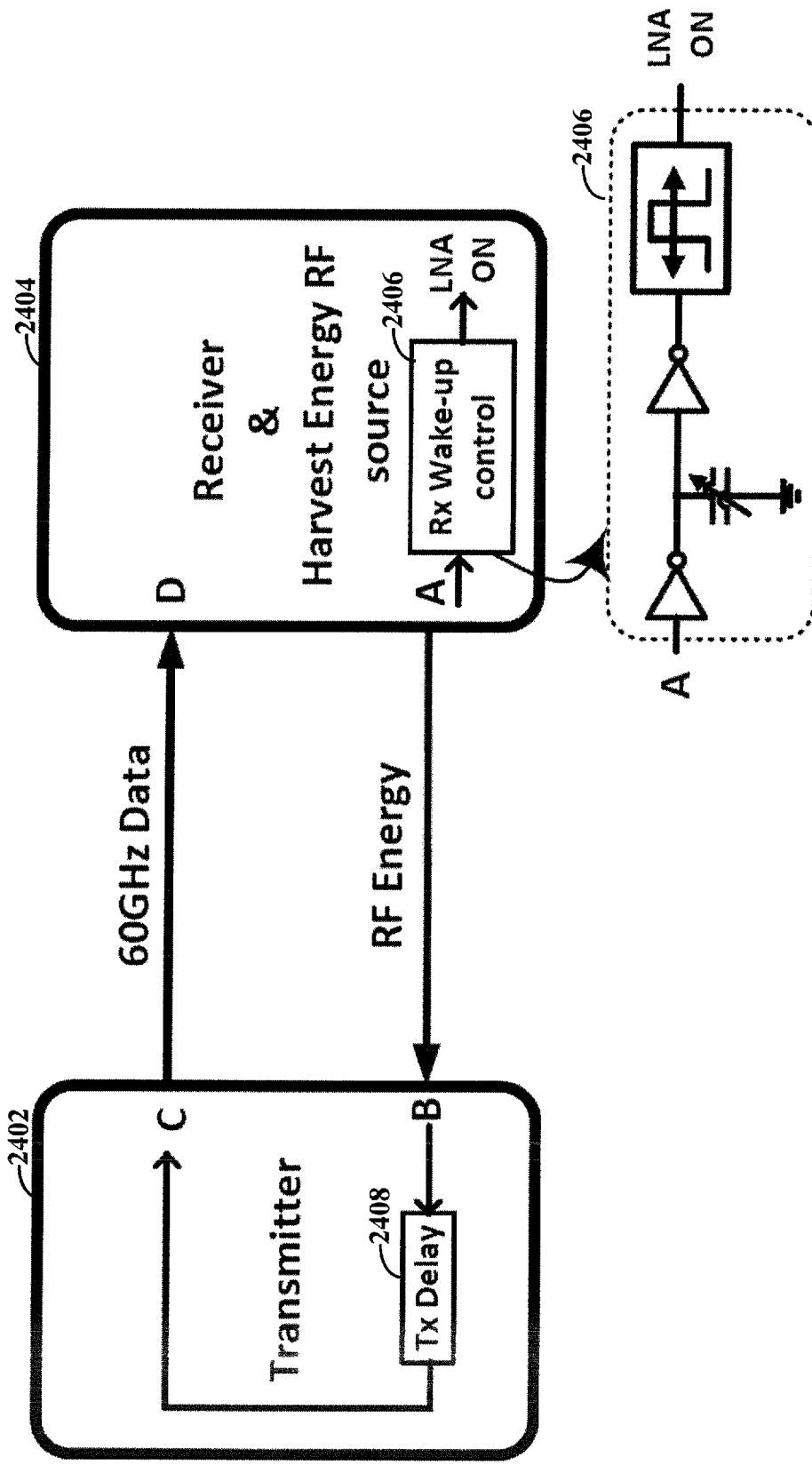
FIG. 24 shows a block diagram of a system that includes receiver (or reader) device that is configured with power saving features, consistent with embodiments of the present disclosure.

FIG. 24 shows a block diagram of a system that includes receiver (or reader) device that is configured with power saving features, consistent with embodiments of the present disclosure. A transmitter (or tag) device 2402 can be configured to communicate with a receiver (or reader) device 2404. As discussed herein, the receiver device 2404 can be configured to generate and transmit an RF signal (point "A") that the transmitter device 2402 can receive (at point "B") and use as a power source. The transmitter device 2402 can also be configured to generate clock from this RF signal and this clock can be used in the generation of a communication back to the receiver device (from point "C" to point "D").

In particular embodiments, the transmitter device can be configured to generate pulse from a high frequency signal (e.g., at 60 GHz) and the pulses can be timed according to the generated clock. For example, the generation of a pulse can be accomplished by gating the high frequency signal with a signal that represents a logical AND of the generated clock and data to be transmitted. Thus, the transmitter will only transmit data when the generated clock is high and there is data. A resulting delay between the receipt of the RF signal and the resulting transmission is shown by the box 2408.

Consistent with embodiments, the receiver device 2404 uses a local clock to both generate the RF energy-providing signal and to control the power state of receiver circuitry. For instance, the receiver device 2404 can be configured to enter a reduced power state (e.g., by turning OFF receiver circuit elements) when the clock signal is low, based upon the assumption that the transmitter sends data only when the clock signal is high. Thus, with a clock duty cycle of 50%, the power consumption of the receiver will be reduced by a factor of two. According to embodiments, a receiver (RX) wake up control circuit 2406 can generate a control signal that is used to control the reduced power state. In particular, the wake up control circuit 2406 can introduce a delay to the clock signal and provide the resulting output to LNA's of the receiver circuitry. Consistent with embodiments, the wake up control circuit 2406 can include a variable delay element that can be tuned based upon BER.

In certain embodiments, the use of pulse width controller (PWC) circuit in the transmitter reduces the transmit data pulse width to save power on the transmitter side. The receiver can be configured to adjust the on-time of the RF clock in response to knowledge of the transmitter's corresponding PWC configuration, which can lead to additional power savings. To ensure proper synchronization between the transmitter (Tx) and receiver (Rx), the clock to data delay for path (A→B→D) and A→LNA ON should be identical.

Figure 25:
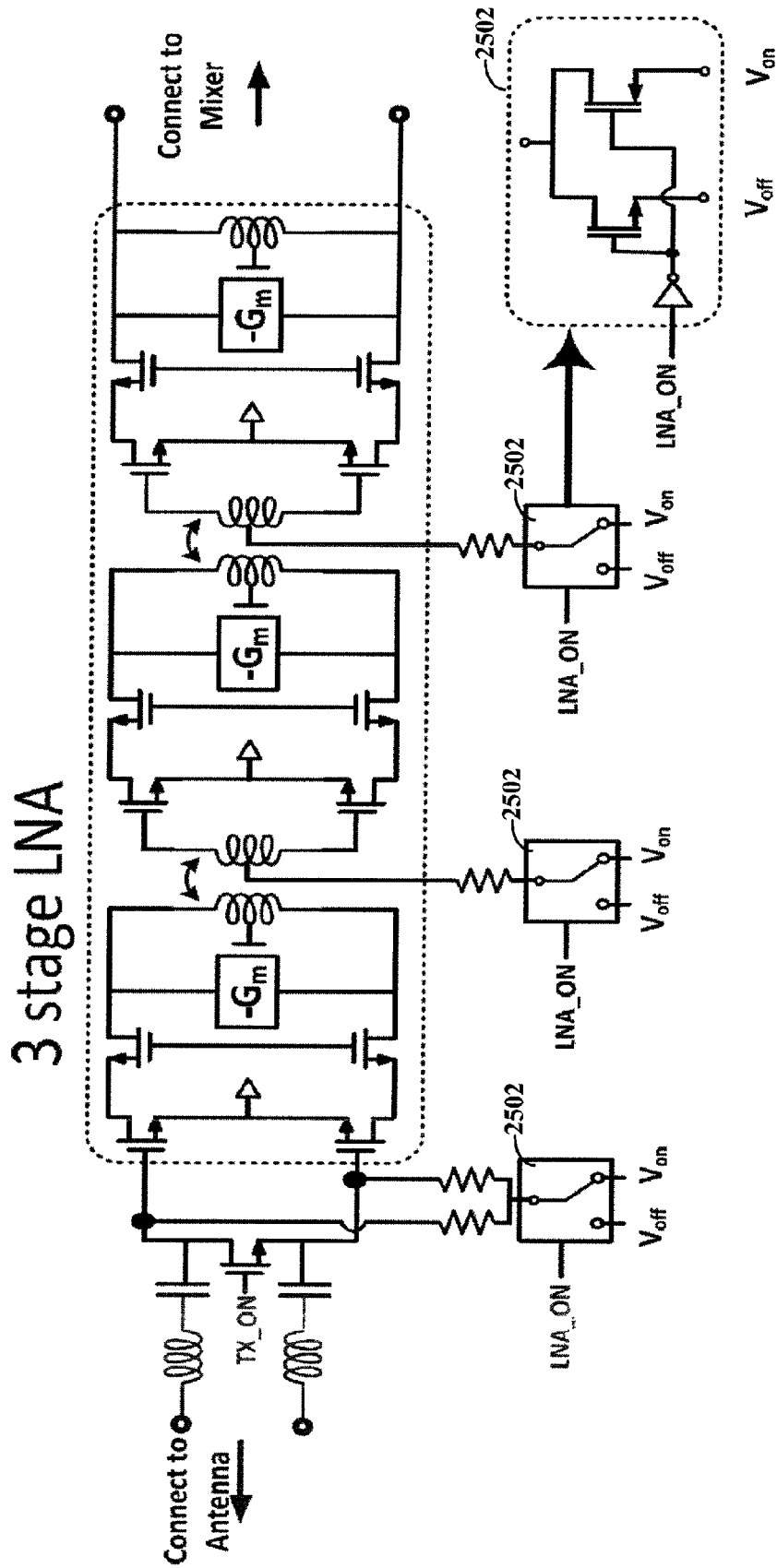
FIG. 25 shows a circuit level implementation for a low power receiver where the three-stage LNA is turned ON/OFF using the information from harvest clock, consistent with embodiments of the present disclosure.

FIG. 25 shows a circuit level implementation for a low power receiver where the three-stage LNA is turned ON/OFF using the information from harvest clock, consistent with embodiments of the present disclosure. LNA control blocks 2502 can be configured to respond to the control signal from the wake up control circuit by disabling the corresponding LNA circuits. For instance, the voltage Voff can be set to a voltage that overrides the input to the LNA drivers so that they do not switch. Similarly, Von can be set to allow the LNA drivers to properly function and switch according to a signal received form the antenna.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities. For example, in certain of the above-discussed embodiments, one or more modules are discrete logic circuits or programmable logic circuits configured and arranged for implementing these operations/activities. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, the antenna structures and particular frequencies of operation can be adjusted for different applications. Such modifications do not depart from the true spirit and scope of various aspects of the invention, including aspects set forth in the claims.

What is claimed is:

1. An apparatus comprising:
   a power supply circuit configured to receive, from an antenna, a first signal having a first frequency exceeding a GHz, and including a rectifier circuit that is impedance matched to the antenna at the first frequency and that is configured to generate a supply voltage by rectifying the first signal at the first frequency;
   a signal generation circuit configured to use the supply voltage to generate a second signal having a second frequency that is higher than the first frequency and to operate in two different power modes in response to a data signal; and
   a transmitter circuit that is configured to use the supply voltage to create pulses from the second signal and in response to the data signal, and that includes an amplifier circuit configured to receive the pulses and provide an amplification of the pulses to the antenna.

2. The apparatus of claim 1, further comprising semiconductor chip that includes a semiconductor substrate, the antenna and another antenna on the semiconductor substrate and wherein the transmitter circuit is configured to generate two versions of the pulses and to provide the two versions of the pulses to a respective and different one of the antennas.

3. The apparatus of claim 2, wherein the antennas are each dipole antennas that are configured for transmission at 60 GHz.

4. The apparatus of claim 2, further comprising another signal generation circuit and wherein each of the signal generation circuits includes a voltage controlled oscillator circuit with a tank circuit and wherein each of the signal generation circuits is configured to phase align by applying a voltage initial condition that places at least one of the transistors of the tank circuit in a triode condition.

5. The apparatus of claim 2, wherein the antennas are separated by a distance that is less than ½ wavelength of the second frequency in air.

6. The apparatus of claim 1, further comprising a transceiver circuit that includes the transmitter circuit and a receiver circuit that is configured to process an RF signal received on the antenna.

7. The apparatus of claim 6, further comprising a transmit-receive switch that is configured to couple the receiver circuit to the antenna while isolating the transmitter circuit from the antenna and to couple the transmitter circuit to the antenna while isolating the receiver circuit from the antenna.

8. The apparatus of claim 1, further comprising a pulse width control circuit configured to adjust a pulse width for the pulses as a function of a data rate of transmission.

9. The apparatus of claim 1, wherein the power supply circuit is configured to store energy for the supply voltage in a capacitor and to regulate the supply voltage using voltage thresholds that provide hysteresis for the supply voltage.

10. An apparatus comprising:
    an encoding circuit configured to generate a data signal that has pulses occurring according to data and a first frequency;
    an oscillator circuit configured to
      enter, in response to the pulses, a first mode in which the oscillator circuit is configured to generate an output signal that oscillates at a second carrier frequency that is higher than the first frequency, and
      enter, in response to the pulses, a second mode in which the oscillator circuit is configured to reduce power consumption by disabling the generation of the output signal; and
    a power amplifier circuit configured to
      enter, in response to the pulses, a third mode in which the power amplifier circuit is configured to amplify the output signal and provide the output signal, as amplified, to an antenna, and
      enter, in response to the pulses, a fourth mode in which the power amplifier circuit is configured to reduce power consumption by disabling the amplification of the output signal.

11. The apparatus of claim 10, wherein the encoding circuit is configured to generate the data signal and pulses according to a return-to-zero on-off keying modulation.

12. The apparatus of claim 10, wherein the oscillator circuit is a voltage controlled oscillator.

13. The apparatus of claim 10, further comprising a pulse-width controller circuit that is configured to modify a width of the pulses of the data signal according to a power control signal, and wherein the oscillator circuit is configured to enter the first and second modes in response to a presence or absence of the pulses, and the power amplifier circuit is configured to enter the third and fourth modes in response to the presence or absence of the pulses.

14. The apparatus of claim 10, wherein the first frequency is about 2.5 GHz and the second carrier frequency is about 60 GHz.

15. A semiconductor chip comprising:
    a semiconductor substrate;
    a first antenna on the semiconductor substrate;
    a second antenna on the semiconductor substrate and located at a distance from the first antenna;
    a multiple-input multiple-output transceiver circuit configured to use the first and second antenna to transmit data using signals having a wavelength that is more than twice the distance; and
    a conductive plate that is configured to improve gain of the first and second antennas for the signals having the wavelength.

16. The semiconductor chip of claim 15, wherein the distance is less than 1/10 of the wavelength.

17. The semiconductor chip of claim 15, wherein the distance is about 1/20 of the wavelength.

18. The semiconductor chip of claim 15, wherein the conductive plate is metal.

19. The semiconductor chip of claim 15, wherein the first and second antennas are dipole antennas, further including a power supply circuit configured to receive, from the first antenna, a first signal having a first frequency exceeding a GHz, and including a rectifier circuit that is impedance matched to the first antenna at the first frequency and that is configured to generate a supply voltage by rectifying the first signal at the first frequency, and wherein the transceiver circuit includes a transmitter circuit configured and arranged to generate two versions of pulses and to provide the two versions of the pulses to a respective and different one of the first and second antennas.

20. The semiconductor chip of claim 15, wherein the wavelength is about 5 mm.

21. The semiconductor chip of claim 15, further including the encoding, oscillator, and power amplifier circuits of the apparatus of claim 10.

* * * * *